(12) United States Patent
Zents et al.

(10) Patent No.: US 12,269,168 B2
(45) Date of Patent: *Apr. 8, 2025

(54) INCITING SEDIMENT GRAVITY FLOW IN PILED GRAIN

(71) Applicant: Grain Weevil Corporation, La Vista, NE (US)

(72) Inventors: Zane Zents, Omaha, NE (US); Chad E. Johnson, Omaha, NE (US); Benjamin H. Johnson, La Vista, NE (US)

(73) Assignee: Grain Weevil Corporation, La Vista, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,471

(22) Filed: Oct. 6, 2023

(65) Prior Publication Data

US 2024/0033919 A1 Feb. 1, 2024

Related U.S. Application Data

(63) Continuation of application No. 17/982,590, filed on Nov. 8, 2022, now Pat. No. 11,858,145, which is a continuation-in-part of application No. 17/195,021, filed on Mar. 8, 2021, now Pat. No. 12,037,185.

(60) Provisional application No. 63/277,232, filed on Nov. 9, 2021, provisional application No. 62/987,311, filed on Mar. 9, 2020.

(51) Int. Cl.
| | |
|---|---|
| *B25J 9/16* | (2006.01) |
| *B25J 13/00* | (2006.01) |
| *B25J 13/08* | (2006.01) |
| *B65D 88/08* | (2006.01) |
| *B65D 88/66* | (2006.01) |

(52) U.S. Cl.
CPC ............. *B25J 9/1664* (2013.01); *B25J 9/161* (2013.01); *B25J 13/006* (2013.01); *B25J 13/087* (2013.01); *B65D 88/08* (2013.01); *B65D 88/66* (2013.01)

(58) Field of Classification Search
CPC ........ B25J 9/161; B25J 9/1664; B25J 13/006; B25J 13/087; B65D 88/08; B65D 88/66
See application file for complete search history.

(56) References Cited

U.S. PATENT DOCUMENTS

| | | | |
|---|---|---|---|
| 1,400,747 A | 12/1921 | Hopwood | |
| 1,622,565 A | 3/1927 | Beaumont | |

(Continued)

FOREIGN PATENT DOCUMENTS

| | | |
|---|---|---|
| WO | 2023086356 A1 | 5/2023 |
| WO | 2023225535 A1 | 11/2023 |

OTHER PUBLICATIONS

PCT Application No. PCT/US2022/049356; International Search Report and Written Opinion of the International Searching Authority, Feb. 17, 2023; 14 pages.

(Continued)

*Primary Examiner* — Saul Rodriguez
*Assistant Examiner* — Ashley K Romano

(57) ABSTRACT

A piled grain surface management robot comprises an auger-based drive system, a memory, and a processor coupled with the memory. The processor is configured to control movement of the robot via the auger-based drive system. The processor is also configured to direct a traversal of a surface of piled grain in a bulk store, wherein a crust layer of the surface is broken up by auger rotation of the auger-based drive system during the traversal.

23 Claims, 23 Drawing Sheets

(56) References Cited

U.S. PATENT DOCUMENTS

| | | | |
|---|---|---|---|
| 2,174,348 | A | 9/1939 | Emile |
| 3,124,170 | A | 3/1964 | Cooper |
| 3,366,283 | A | 1/1968 | Newcomb |
| 3,469,719 | A | 9/1969 | Peterson |
| 3,593,892 | A | 7/1971 | Petit |
| 3,949,888 | A | 4/1976 | Gessler et al. |
| 4,077,526 | A | 3/1978 | Gessler et al. |
| 4,207,005 | A | 6/1980 | Stanfield |
| 4,601,414 | A | 7/1986 | Lawson |
| 4,720,025 | A | 1/1988 | Tatevosian et al. |
| 5,472,117 | A | 12/1995 | Geiser et al. |
| 6,499,929 | B1 | 12/2002 | Salgado et al. |
| 9,469,472 | B2 | 10/2016 | Anderson |
| 10,329,103 | B1 | 6/2019 | Moen |
| 10,377,573 | B2 | 8/2019 | Olson et al. |
| 11,337,374 | B2 | 5/2022 | Olson et al. |
| 11,608,236 | B2 | 3/2023 | Olson |
| 12,037,185 | B2 | 7/2024 | Johnson et al. |
| 2003/0024945 | A1 | 2/2003 | Dasilva |
| 2009/0087523 | A1 | 4/2009 | Freeman et al. |
| 2012/0215348 | A1 | 8/2012 | Skrinde |
| 2013/0216340 | A1 | 8/2013 | Luster et al. |
| 2013/0216341 | A1 | 8/2013 | Luster et al. |
| 2014/0250717 | A1 | 9/2014 | Bloemendaal |
| 2019/0018378 | A1 | 1/2019 | Varikooty et al. |
| 2019/0219980 | A1 | 7/2019 | Dahlin |
| 2019/0391018 | A1 | 12/2019 | Dann |
| 2020/0172159 | A1 | 6/2020 | Kuwabara et al. |
| 2020/0263923 | A1 | 8/2020 | Bloemendaal |
| 2021/0061549 | A1 | 3/2021 | Risser et al. |
| 2021/0122563 | A1 | 4/2021 | Igarashi et al. |
| 2021/0276794 | A1 | 9/2021 | Johnson et al. |
| 2022/0170696 | A1 | 6/2022 | Rogoschewsky et al. |
| 2023/0061995 | A1 | 3/2023 | Johnson et al. |
| 2023/0067298 | A1 | 3/2023 | Koch et al. |
| 2023/0068940 | A1 | 3/2023 | Johnson et al. |
| 2023/0172112 | A1 | 6/2023 | Olson |
| 2023/0276739 | A1 | 9/2023 | Johnson et al. |
| 2023/0277990 | A1 | 9/2023 | Johnson et al. |
| 2023/0278215 | A1 | 9/2023 | Johnson et al. |
| 2023/0284567 | A1 | 9/2023 | Johnson et al. |
| 2024/0033918 | A1 | 2/2024 | Johnson et al. |
| 2024/0278980 | A1 | 8/2024 | Johnson et al. |
| 2024/0286827 | A1 | 8/2024 | Johnson et al. |
| 2024/0399576 | A1 | 12/2024 | Vanderheyden et al. |
| 2024/0408754 | A1 | 12/2024 | Bogado Torres et al. |
| 2025/0042030 | A1 | 2/2025 | Vanderheyden et al. |
| 2025/0060760 | A1 | 2/2025 | Bogado Torres et al. |

OTHER PUBLICATIONS

PCT Application No. PCT/US2023/067090; International Search Report and Written Opinion of the International Searching Authority, Sep. 21, 2023; 10 pages.

Aglaunch Initiative, Grain Weevil Pitch Video. Youtube.com Video. Mar. 2, 2021, 16 pgs. [retrieved on Jul. 28, 2023]. Retrieved from the Internet: <https://www.youtube.com/watch?v=xvPP7y1pMS8>; entire document, especially 0:06, 0:15, 0:30, 0:45, 1:18, 1:31, 1:36, 1:40, 1:48, 1:50, 1:56, 2:02. 2:16, 2:38, 3:25, 3:54.

Bedford, L., "Grain Weevil Robot: Technology keeps farmers out of the grain bins", Successful Farming, Jan. 28, 2021, 1 pg. [retrieved on Jul. 28, 2023]. Retrieved from the Internet: <https://www.agriculture.com/technology/crop-managemen/grain-weevil-robot>; entire document.

Bhadra, R. et al., "Field-Observed Angles of Repose for Stored Grain in the United States", Applied Engineering in Agriculture, 33(1) ISSN 0883-8542, pp. 131-137, American Society of Agricultural and Biological Engineers, Jan. 30, 2017. [retrieved on Jul. 28, 2023]. Retrieved from the Internet: <https://krex.k-state.edu/bitstream/handle/2097/35277/PRS%2011894.pdf?sequence=1>; entire document, especially Abstract, p. 131, col. 1, para 1—p. 131, col. 2, para 1.

Grain Weevil, "Grain Bin Management Robot", Grain Weevil Webpage, Apr. 20, 2021, 3 p. [retrieved on Jul. 28, 2023]. Retrieved from the Internet: <https://web.archive.org/web/20210420023328/https://www.grainweevil.com/>; entire document, especially p. 1, col. 2, para 4.

Jones, C. et al., "Aeration and Cooling of Stored Grain", Oklahoma State University, Oklahoma Cooperative Extension Service, BAE-1101, Feb. 2017, 5 p. [retrieved on Jul. 28, 2023]. Retrieved from the Internet: <https://extension.okstate.edu/fact-sheets/print-publications/bae/aeration-and-cooling-of-stored-grain-bae-1101.pdf>; entire document, especially p. 1, col. 1, para 1. p. 3, col. 2, para 10, p. 4, col. 2, para 2.

Laws, F., "Robot Innovation Promises to Keep Farmers Out of Grain Bins", Farm Progress, Mar. 24, 2021, 13 pgs. [retrieved on Jul. 28, 2023]. Retrieved from the Internet <https://www.farmprogress.com/farming-equipment/robot-innovation-promises-to-keep-farmers-out-of-grain-bins>; entire document.

PCT Application No. PCT/US2023/067090; International Preliminary Report on Patentability, Nov. 28, 2024; 8 pages.

800

---

OBTAIN, BY A ROBOT, A FIRST MEASUREMENT OF AN ANGLE OF SLOPE OF A PORTION OF PILED GRANULAR MATERIAL IN A BULK STORE, WHEREIN THE ROBOT COMPRISES AN AUGER-BASED DRIVE SYSTEM
810

---

IN RESPONSE TO THE FIRST MEASUREMENT SATISFYING A FIRST CONDITION, TRAVERSE, BY THE ROBOT, THE PORTION OF PILED GRANULAR MATERIAL TO INCITE SEDIMENT GRAVITY FLOW IN THE PORTION OF PILED GRANULAR MATERIAL BY DISRUPTION OF VISCOSITY OF THE PORTION OF PILED GRANULAR MATERIAL THROUGH AGITATION OF THE PORTION OF PILED GRANULAR MATERIAL BY AUGER ROTATION OF THE AUGER-BASED DRIVE SYSTEM
820

---

OBTAIN, BY THE ROBOT, A SECOND MEASUREMENT OF THE ANGLE OF SLOPE OF THE PORTION OF PILED GRANULAR MATERIAL
830

---

IN RESPONSIVE TO THE SECOND MEASUREMENT SATISFYING A SECOND CONDITION, CEASING TRAVERSAL OF THE PORTION OF PILED GRANULAR MATERIAL
840

RESPONSIVE TO THE SECOND MEASUREMENT FAILING TO SATISFY THE SECOND CONDITION, CONTINUE THE TRAVERSAL, BY THE ROBOT, OF THE PORTION OF PILED GRANULAR MATERIAL
850

800 CONTINUED

CAPTURE, BY A SENSOR OF THE ROBOT, A MEASUREMENT OF A CHARACTERISTIC OF THE PORTION OF PILED GRANULAR MATERIAL DURING THE TRAVERSAL OF THE PORTION OF PILED GRANULAR MATERIAL
860

800 CONTINUED

```
CAPTURE, BY A SENSOR OF THE ROBOT, A TEMPERATURE MEASUREMENT OF
THE PORTION OF PILED GRANULAR MATERIAL DURING THE TRAVERSAL OF
THE PORTION OF PILED GRANULAR MATERIAL
870
```

800 CONTINUED

```
COLLECT, BY THE ROBOT, A SAMPLE FROM THE PORTION OF PILED
GRANULAR MATERIAL DURING THE TRAVERSAL OF THE PORTION OF PILED
GRANULAR MATERIAL
880
```

1400

```
┌─────────────────────────────────────────────────────────────────┐
│ RECEIVE AT A ROBOT, INSTRUCTIONS TO TRAVERSE A SURFACE OF PILED │
│                    GRAIN IN A BULK STORE                        │
│                            1410                                 │
└─────────────────────────────────────────────────────────────────┘
                                │
                                ▼
┌─────────────────────────────────────────────────────────────────┐
│      CONTROL, BY A PROCESSOR ACCORDING TO THE INSTRUCTIONS,     │
│    MOVEMENT OF THE ROBOT VIA AN AUGER-BASED DRIVE SYSTEM TO     │
│ TRAVERSE A SURFACE OF PILED GRAIN IN A BULK STORE, WHEREIN A CRUST│
│  LAYER OF THE SURFACE IS BROKEN UP BY AUGER ROTATION OF THE AUGER-│
│              BASED DRIVE SYSTEM DURING THE TRAVERSAL            │
│                            1420                                 │
└─────────────────────────────────────────────────────────────────┘
                                │
                                ▼
┌─────────────────────────────────────────────────────────────────┐
│       DIRECT, BY THE PROCESSOR ACCORDING TO THE INSTRUCTIONS,   │
│  TRAVERSAL BY THE ROBOT OF A SLOPED PORTION OF THE PILED GRAIN TO│
│ INCITE SEDIMENT GRAVITY FLOW IN THE SLOPED PORTION OF PILED GRAIN│
│   BY DISRUPTION OF VISCOSITY OF THE SLOPED PORTION OF PILED GRAIN│
│  THROUGH AGITATION OF THE SLOPED PORTION OF THE PILED GRAIN BY THE│
│    AUGER ROTATION OF THE AUGER-BASED DRIVE SYSTEM, WHEREIN THE  │
│   SEDIMENT GRAVITY FLOW REDUCES A SLOPE OF THE SLOPED PORTION   │
│                            1430                                 │
└─────────────────────────────────────────────────────────────────┘
```

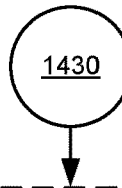

CAPTURE, BY A SENSOR OF THE ROBOT, A MEASUREMENT OF A CHARACTERISTIC OF A PORTION OF PILED GRAIN DURING THE TRAVERSAL OF THE PORTION OF PILED GRAIN
1440

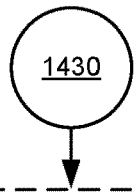

CAPTURE, BY A SENSOR OF THE ROBOT, A TEMPERATURE MEASUREMENT OF A PORTION OF PILED GRAIN DURING THE TRAVERSAL OF THE PORTION OF PILED GRAIN.
1450

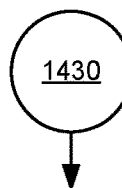

DELIVER A PROBE ONTO THE SURFACE OF THE PILED GRAIN DURING THE TRAVERSAL
1460

FIG. 14D

INCITING SEDIMENT GRAVITY FLOW IN PILED GRAIN

CROSS-REFERENCE TO RELATED APPLICATIONS

This application is a continuation application of and claims priority to and benefit of U.S. patent application Ser. No. 17/982,590 (now U.S. Pat. No. 11,858,145) filed on Nov. 8, 2022, entitled "SURFACE MANAGEMENT OF PILED GRAIN" by Benjamin H. Johnson et al., and assigned to the assignee of the present application, the disclosure of which is hereby incorporated herein by reference in its entirety.

Application Ser. No. 17/982,590 claims priority to and benefit of then U.S. Provisional Patent Application No. 63/277,232 filed on Nov. 9, 2021 entitled "PRECISE PAYLOAD DELIVERY RELATIVE TO PILED GRANULAR MATERIAL" by Benjamin H. Johnson et al., and assigned to the assignee of the present application, the disclosure of which is hereby incorporated herein by reference in its entirety.

Application Ser. No. 17/982,590 is a continuation-in-part application of and claims priority to and benefit of U.S. patent application Ser. No. 17/195,021 (now U.S. Pat. No. 12,037,185) filed on Mar. 8, 2021, entitled "Bulk Store Slope Adjustment" by Benjamin H. Johnson et al., and assigned to the assignee of the present application, the disclosure of which is hereby incorporated herein by reference in its entirety.

Application Ser. No. 17/195,021 claimed priority to and benefit of then U.S. Provisional Patent Application No. 62/987,311 filed on Mar. 9, 2020 entitled "METHOD AND APPARATUS FOR SAFE GRAIN BIN/SILO GRAIN EXTRACTION ASSISTANCE" by Benjamin H. Johnson et al., and assigned to the assignee of the present application.

BACKGROUND

Some examples of granular material include, without limitation, include: grain (e.g., small hard seeds such as soybean seeds, pinto beans, corn kernels, wheat, and rice), non-grain plant seeds (e.g., flower seeds and grass seeds), nuts (e.g., shelled or unshelled tree nuts or ground nuts), sand, pelletized products (e.g., wood pellets, plastic pellets, etc.) and milled/ground products (e.g., flour, sugar, and mineral/rock aggregates, etc.). Granular material is often piled in a bulk store, either in the open or in a container such as a bin. Bulk stores, such as grain bins, are often hot, dirty, dusty, and dangerous workplaces. To adequately manage bulk stored granular materials farmers and/or other workers are required to enter bulk stores and/or climb about on the surface of a pile of the bulk stored granular material. Such interactions expose the farmer/worker to falls, entrapments, explosions, auger entanglements, heat stroke, and long-term conditions such as Farmer's Lung.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 4A-1, 4A-2, and 4A-3 illustrate front elevational views of the exterior of a device which moves about and/or operates in relation to a pile of granular material, in accordance with various embodiments.

FIGS. 4B-1 and 4B-2 illustrate rear elevational views of the exterior of a device which moves about and/or operates in relation to a pile of granular material, in accordance with various embodiments.

FIGS. 4C-1 and 4C-2 illustrate right elevational views of the exterior of a device which moves about and/or operates in relation to a pile of granular material, in accordance with various embodiments.

FIGS. 4D-1 and 4D-2 illustrate left elevational views of the exterior of a device which moves about and/or operates in relation to a pile of granular material, in accordance with various embodiments.

FIGS. 4E-1 and 4E-2 illustrate bottom plan views of the exterior of a device which moves about and/or operates in relation to a pile of granular material, in accordance with various embodiments.

FIGS. 8A-E illustrate a flow diagram of an example method of bulk store slope adjustment, in accordance with various embodiments.

FIGS. 14A-14D illustrate a flow diagram of an example method of surface management of piled grain, in accordance with various embodiments.

DESCRIPTION OF EMBODIMENTS

Figure 1:
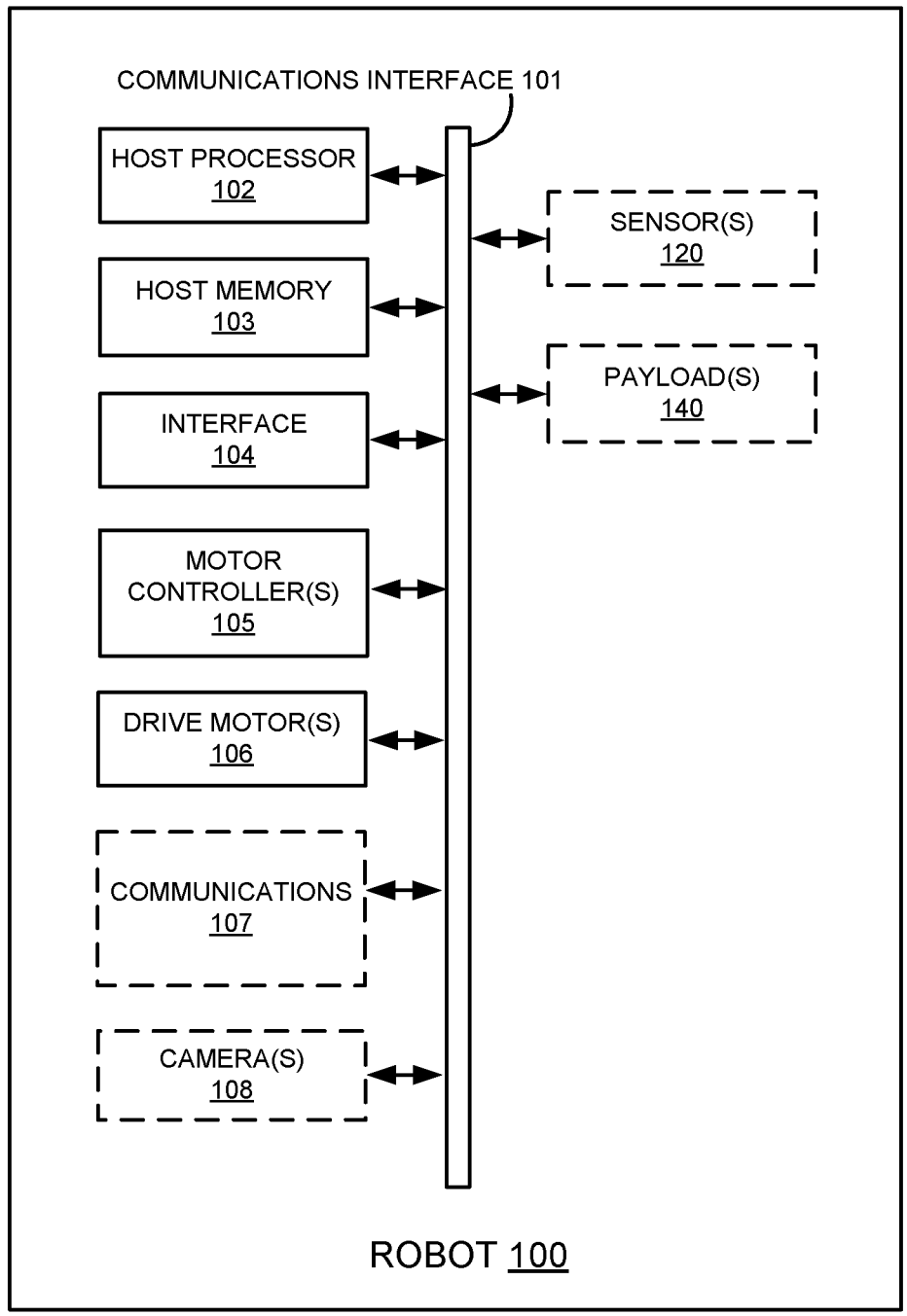
FIG. 1 shows an example block diagram of some aspects of a device which moves about and/or operates in relation to a pile of granular material, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

A device which can operate via remote controlled instruction, autonomously, or some combination thereof is described. The device is robotic and may be referred to as a "robot" or as a "robotic device," and includes an auger-based drive system which facilitates the movement and/or operation of the device in relation to a portion of piled granular material in a bulk store, such as a grain bin. More particularly, because of the augers in the auger-based drive system, the device can operate and maneuver upon or beneath piled granular material. Additionally, and advantageously, augers of the auger-based drive system move and disrupt piled granular material as a consequence of the movement of the device.

A bulk store is the place where granular material is piled for bulk storage. Although a grain bin is frequently used herein as an example of a bulk store, nearly any bulk store which is large enough for a human to access and work inside or upon the stored granular material is a candidate for operation of the device described herein. Accordingly, it should be appreciated that other large bulk stores are also suitable bulk stores for use of the described device in relation to piled granular material in many of the manners described herein. Some examples of other large bulk stores include, but not limited to: containers (e.g., railcars, semi-trailers, barges, ships, and the like) for transport/storage of granular material, buildings (e.g., silos) for storage of granular material, and open storage piles of granular material.

Bulk stored granular material can present many safety concerns for humans. For example, bulk stores are often hot, dusty, poorly lit, and generally inhospitable work environments for humans. Additionally, entrapments can take place when a farmer or worker is in a bin and bulk stored material, such as grain, slides onto or engulfs the person. Entrapments can happen because a slope angle of the piled granular material (e.g., grain) is at a critical angle which may slide when disturbed by the person else when may slide when extraction augers disturb the bulk stored granular material. As one example, steep walls of grain can avalanche onto a farmer/worker trying to mitigate problems in a grain bin, inspect the stored grain, or agitate the grain to improve the outflow. Sometimes a crust layer can form on the surface of a pile of grain. Additionally, sometimes a crust layer can form over a void in a pile of grain and when a farmer/worker walks across it or tries to break it with force it may collapse. This type of crust is called a grain bridge, and the grain bridge can collapse and entrap a person who walks on it. As this grain bridge and/or the size of the void below it may be invisible to the human eye, it can present an unknown danger to a farmer/worker. As will be discussed, many of these and other safety concerns can be reduced or eliminated through use of the device and techniques/methods described herein.

Among other things, the device described herein can be used to address managing the quality of bulk stored granular material (e.g., grain in a bin) through tasks like, but not limited to: inspections of the bulk stored granular material, leveling of the bulk stored granular material, agitating of the bulk stored granular to prevent/reduce spoilage, dispersing of the bulk stored granular material while it is being loaded into the bulk store, feeding a sweep auger or other collection device which removes the bulk stored granular material from the bulk store, and/or lowering the slope angles of the granular material in a partially emptied bulk store. In short, the device can accomplish numerous tasks which when done by the device preclude the need for humans to enter a bulk store, or else make it safer when it is necessary for humans to enter a bulk store. In various embodiments, these tasks can be carried out by the device under remote-control of the device by an operator located outside the bulk store, may be carried out in a partially fashion by the device, and/or may be carried out by the device in fully automated fashion.

Discussion begins with a description of notation and nomenclature. Discussion then shifts to description of some block diagrams of example components of some examples of a device which moves about and/or operates in relation to a bulk stored pile of granular material. A variety of sensors and payloads which may be included with and/or coupled with the device are described. Numerous example views of the exterior of a device are presented and described, to include description of the auger-based drive system of the device. Several systems for remote-controlled semi-autonomous, and autonomous operation of the device are described. Additionally, systems and techniques for storing information from the device and/or providing information and/or instructions to the device are described. An example bulk store for granular material is then depicted and described in conjunction with operation of the device in relation to piled granular material in the bulk store. Several methods for delivery, by the device, of probes in a bulk store are discussed. Operation of the device and components thereof, to include some sensors and/or payloads of the device, are discussed in conjunction with description of an example method of bulk store leveling and in conjunction with a method of surface management of piled grain.

Notation and Nomenclature

Some portions of the detailed descriptions which follow are presented in terms of procedures, logic blocks, processes, modules and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "controlling," "obtaining," "satisfying," "failing to satisfy," "traversing," "inciting," "satisfying," "ceasing traversal," "continuing traversal," "capturing," "sensing," "collecting," "directing," and "determining," "communicating," "receiving," "receiving instructions," "receiving data," "sending," "relaying," "providing access," "deliver," "deposit," "place," and "communicatively coupling," or the like, refer to the actions and processes of an electronic device or component such as (and not limited to): a host processor, a sensor processing unit, a sensor processor, a digital signal processor or other processor, a memory, a sensor (e.g., a temperature sensor, motion sensor, etc.), a computer, a remote controller, a device which moves about and/or operates in relation to a portion of piled granular material, some combination thereof, or the like. The electronic device/component manipulates and transforms data represented as physical (electronic and/or magnetic) quantities within the registers and/or memories into other data similarly represented as physical quantities within memories and/or registers or other such information storage, transmission, processing, and/or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer, computer system, or electronic device to perform one or more of the methods and/or actions of a method described herein. The non-transitory computer/processor-readable storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), flash memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

Example Block Diagrams of a Device which Moves about and/or Operates in Relation to a Pile of Granular Material FIG. 1 shows an example block diagram of some aspects of a device 100 which moves about and/or operates in relation to a pile of granular material, in accordance with various embodiments. As previously discussed, device 100 may be referred to a robot and/or robotic device, and device 100 may carry out some or all of its functions and operations based on stored instructions.

As shown, example device 100 comprises a communications interface 101, a host processor 102, host memory 103, an interface 104, motor controllers 105, and drive motors 106. In some embodiments, device 100 may additionally include one or more of communications 107, a camera(s) 108, one or more sensors 120, and/or one or more payloads 140.

Communications interface 101 may be any suitable bus or interface which facilitates communications among/between components of device 100. Examples of communications interface 101 include a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces.

The host processor 102 may, for example, be configured to perform the various computations and operations involved with the general function of device 100 (e.g., sending commands to move, steer, avoid obstacles, and operate/control the operation of sensors and/or payloads). Host processor 102 can be one or more microprocessors, central processing units (CPUs), DSPs, general purpose microprocessors, ASICs, ASIPs, FPGAs or other processors which run software programs or applications, which may be stored in host memory 103, associated with the general functions and capabilities of device 100.

Host memory 103 may comprise programs, modules, applications, or other data for use by host processor 102. In some embodiments, host memory 103 may also hold information that that is received from or provided to interface 104, motor controller(s) 105, communications 107, camera(s) 108, sensors 120, and/or payloads 140. Host memory 103 can be any suitable type of memory, including but not limited to electronic memory (e.g., read only memory (ROM), random access memory (RAM), or other electronic memory).

Interface 104 is an external interface by which device 100 may receive input from an operator or instructions. Interface 104 is one or more of a wired or wireless transceiver which may provide connection to an external transmission source/recipient for receipt of instructions, data, or direction to device 100 or offload of data from device 100. One example of an external transmission source/external recipient may be a base station to which device 100 communicates collected data or from which device 100 receives instructions or direction. Another example of an external transmission source/recipient is a handholdable remote-controller to which device 100 communicates collected data or from which device 100 receives instructions or direction. By way of example, and not of limitation, in various embodiments, interface 104 may comprise one or more of: a cellular transceiver, a wireless local area network transceiver (e.g., a transceiver compliant with one or more Institute of Electrical and Electronics Engineers (IEEE) 802.11 specifications for wireless local area network communication (e.g., WiFi)), a wireless personal area network transceiver (e.g., a transceiver compliant with one or more IEEE 802.15 specifications (or the like) for wireless personal area network communication), and a wired a serial transceiver (e.g., a universal serial bus for wired communication).

Motor controller(s) 105 are mechanism(s), typically circuitry and/or logic, which operate under instruction from processor 102 to drive one or more drive motors 106 with electricity to govern/control the direction and/or speed of rotation of the drive motor(s) 106 and/or or other mechanism of movement to which the drive motor(s) 106 are coupled (such as augers). Motor controller(s) 105 may be integrated with or separate from drive motor(s) 106

Drive motor(s) 106 are electric motors which receive electrical input from motor controller(s) 105 and turn a shaft in a direction and/or speed responsive to the electrical input. In some embodiments, drive motors 106 may be coupled directly to a mechanical means of drive motivation and steering—such as one or more augers. In some embodiments, drive motors 106 may be coupled indirectly, such as via a gearing or a transmission, to a mechanical means of drive motivation and steering—such as one or more augers.

Communications 107, when included, may comprise external interfaces in addition to those provided by interface 104. Communications 107 may facilitate wired and/or wireless communication with devices external to and in some instances remote (e.g., many feet or even many miles away) from device 100. Communications protocols may include those used by interface 104 as well as others. Some examples include, but are not limited to: WiFi, LoRaWAN (e.g., long range wireless area network communications on the license-free sub-gigahertz radio frequency bands), IEEE 802.15.4-2003 standard derived communications (e.g., xBee), IEEE 802.15.4 based or variant personal area network (e.g., Bluetooth, Bluetooth Low Energy, etc.), cellular, and connectionless wireless peer-to-peer communications (e.g., ESP-NOW). In various aspects, communications 107 may be used for data collection/transmission, reporting of autonomous interactions of device 100, and/or user interface and/or operator interface with device 100.

Camera(s) 108 may comprise, without limitation: any type of optical or infrared image sensor for capturing still or moving images. Some examples of suitable cameras include charge-coupled device (CCD) sensor cameras, metal-oxide semiconductor (MOS) sensor cameras, and other digital electronic cameras. Captured images may be utilized by device 100 for purposes such as navigation and decision making, may be stored, and/or may be transmitted to devices external to device 100. In some embodiments, camera(s) 108 facilitate wayfinding for device 100 when operating autonomously or semi-autonomously. In some embodiments, camera(s) 108 facilitate a remote view for an operator when device 100 is manually driven by a human user via a remote controller or computer system communicatively coupled with device 100. In some embodiments, an infrared camera 108 is used to find hotspots of grain to mix or agitate with device 100 (to reduce the heat of the hotspot). In some embodiments, computer vision is used by device 100 to make autonomous decisions based on inputs to processor 102 from camera(s) 108.

Figure 2:
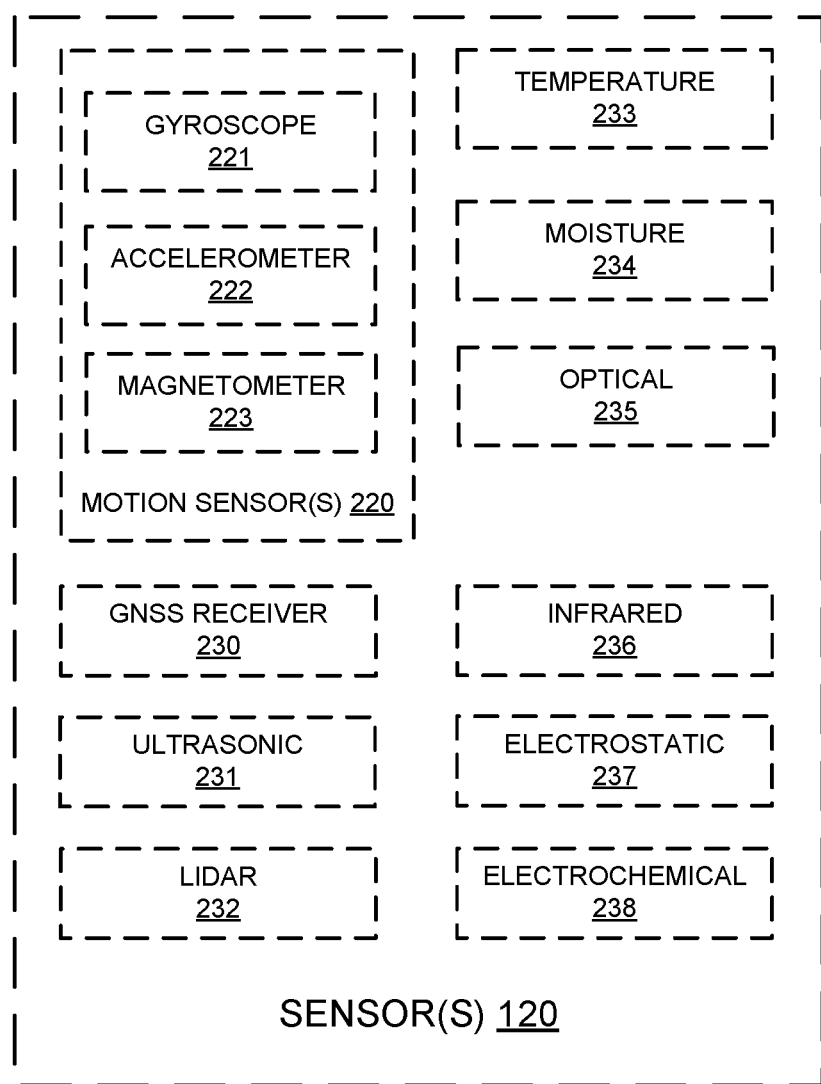
FIG. 2 shows block diagram of a collection of sensors, any or all of which may be incorporated the device of FIG. 1, in accordance with various embodiments.

FIG. 2 shows block diagram of a collection of sensors 120, any or all of which may be incorporated device 100 of FIG. 1, in accordance with various embodiments. Sensors 120 illustrate a non-limiting selection of sensors, which include: motion sensor(s) 220, GNSS (Global Navigation Satellite System) receiver 230, ultrasonic transducer 231, LIDAR (light detection and ranging/laser imaging, detection, and ranging) 232, temperature sensor 233, moisture sensor 234, optical sensor 235, infrared sensor 236 (which may be a receiver or an emitter/receiver), electrostatic sensor 237, and electrochemical sensor 238. In some embodiments, one or more microphones (not depicted), may be included as sensors. For example, an array of microphones may be used with a beamforming technique to locate the directional source of a sound, such as falling granular material being poured, conveyed, streamed, or augured into a bulk store. Some embodiments may additionally, or alternatively, include other sensors not described.

In general, individual sensors 120 operate to detect motion, position, timing, and/or some aspect of environmental context (e.g., temperature, atmospheric humidity, moisture of a sample or probed portion of granular material, distance to an object, shape of an object, solidity of a material, light or acoustic reflectivity, ambient charge, atmospheric pressure, presence of certain chemical(s), noise/sound, etc.). For example, in an embodiment where the piled granular material is grain, many of sensors 120 are used to determine the state of the grain (e.g., temperature, moisture, electrostatic charge, etc.). In some embodiments, one or more sensors 120 are used for fall detection, orientation, and to aid in autonomous direction of movement of device 100. For example, by detecting temperature of grain, device 100 may determine hot spots which need to be mixed by traversal with device 100 or by other means. Similarly, by detecting moisture of grain, device 100 may determine moist spots which need to be mixed by traversal with device 100 or by other means. By detecting an electrostatic and/or electrochemical aspect of the atmosphere in a grain bin, a level of dust or other particulates and/or likelihood of an explosion may be detected in order to gauge safety for a human and/or safety for operating device 100.

Some embodiments may, for example, comprise one or more motion sensors 220. For example, an embodiment with a gyroscope 221, an accelerometer 222, and a magnetometer 223 or other compass technology, which each provide a measurement along three axes that are orthogonal relative to each other, may be referred to as a 9-axis device. In another embodiment three-axis accelerometer 222 and a three-axis gyroscope 221 may be used to form a 6-axis device. Other embodiments may, for example, comprise an accelerometer 222, gyroscope 221, compass, and pressure sensor, and may be referred to as a 10-axis device. Other embodiments may not include all these motions sensors or may provide measurements along one or more axes. In some embodiments, motion sensors 220 may be utilized to determine the orientation of device 100, the angle of slope or inclination of a surface upon which device 100 operates, the velocity of device 100, and/or the acceleration of device 100. In various embodiments, measurements from motion sensors 220 may be utilized by host processor 102 to measure direction and distance of travel and may operate as an inertial navigation system (INS) suitable for controlling and/or monitoring maneuvering of device 100 in a bulk store (e.g., within a grain bin). In some embodiments, motion sensors 220 may be used for fall detection. In some embodiments, motions sensor(s) 220 may be used to detect vibrations in the granular material proximate to device 100.

Figure 3:
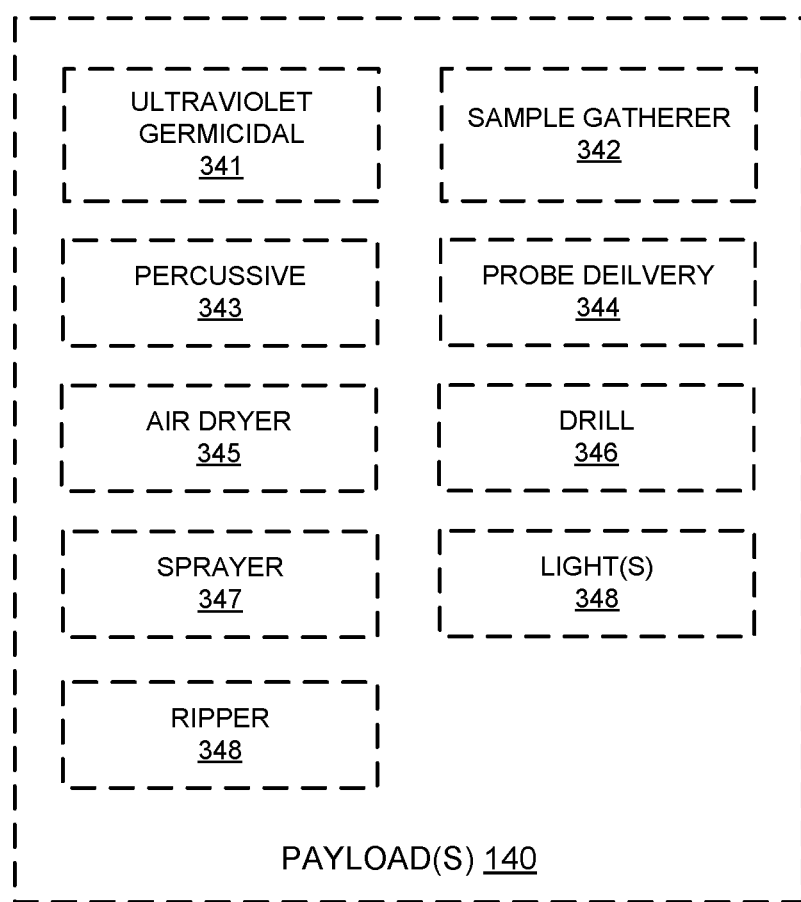
FIG. 3 shows block diagram of a collection of payloads, any or all of which may be incorporated the device of FIG. 1, in accordance with various embodiments.

FIG. 3 shows block diagram of a collection of payloads 140, any or all of which may be incorporated device 100 of FIG. 1, in accordance with various embodiments. Payloads 140 illustrate a non-limiting selection of payloads, which include: ultraviolet germicidal 341, sample gatherer 342, percussive, probe/sensor delivery 344, air dryer 345, drill 346, sprayer 347, lights 348, and/or ripper 349.

Ultraviolet germicidal payload 341, when included, emits ultraviolet light to kill germs by irradiating in the proximity of device 100. Sample gatherer payload 342, when included, provides one or more containers or bays for gathering one or more samples of granular material from a pile of granular material upon which device 100 operates. Percussive payload 343, when included, operates to vibrate, or percussively impact piled granular material touching or in the proximity of device 100. Probe/sensor delivery payload 344, when included, operates to insert one or more probes or sensors into piled granular material upon which device 100 operates and/or to position one or more probes onto piled granular material upon which device 100 operates. Air dryer payload 345, when included, provides a fan and/or heater for drying piled granular material proximate to device 100. Drill payload 346, when included, operates to bore into and/or sample piled granular material and/or break up crusts or aggregations of piled granular material proximate to device 100. Sprayer payload 347, when included, operates to spray fungicide, insecticide, or other liquid or powdered treatments onto piled granular material proximate device 100. Lights payload 348, when included, emit optical and/or infrared illumination in the proximity of device 100. Ripper payload 349, when included, comprises one or more blades, tines, or the like and is used to rip into, agitate, and/or break up crusts or chunks of aggregated granular material proximate device 100. It should be appreciated that various payloads may be delivered, where delivery includes leaving or expelling the payload or a portion thereof at a designated location. For example, delivery can include leaving/installing a probe or sensor. Delivery may also include spraying or spreading a substance such as, but not limited to: a coolant, a flame retardant, an insecticide, a fungicide, or other liquid, gas, or powder.

In various embodiments, one or some combination of payloads 140 may be included in a payload bay of device 100. In some embodiments, the payload bay is fixed in place. In some embodiments, the payload bay may be removably coupled to device 100 to facilitate swapping it for another payload bay to quickly reconfigure device 100 with various different payloads.

Example External Views of a Device which Moves about and/or Operates in Relation to a Pile of Granular Material FIGS. 4A-1, 4A-2, and 4A-3 illustrate front elevational views of the exterior of a device 100 which moves about and/or operates in relation to a pile of granular material, in accordance with various embodiments.

Figures 1, 4A:
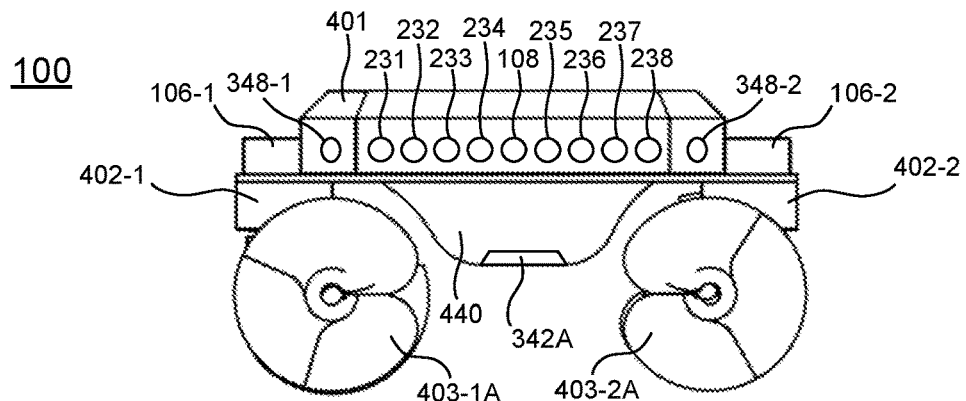
Figures 2, 4A:
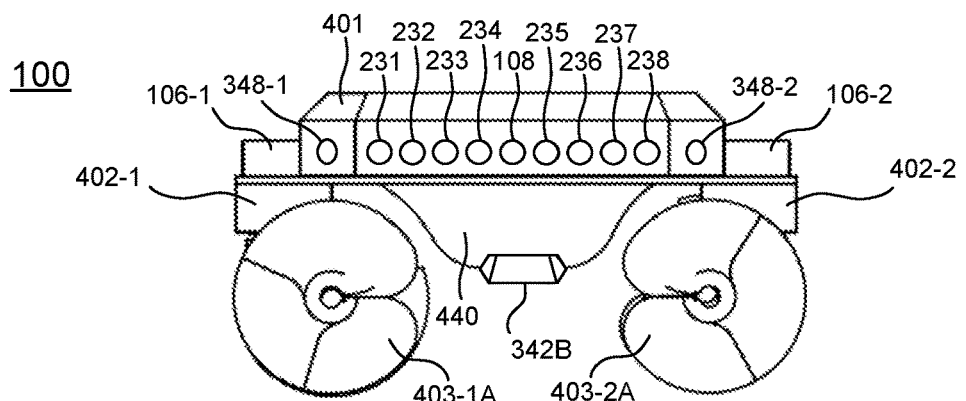
Figures 3, 4A:
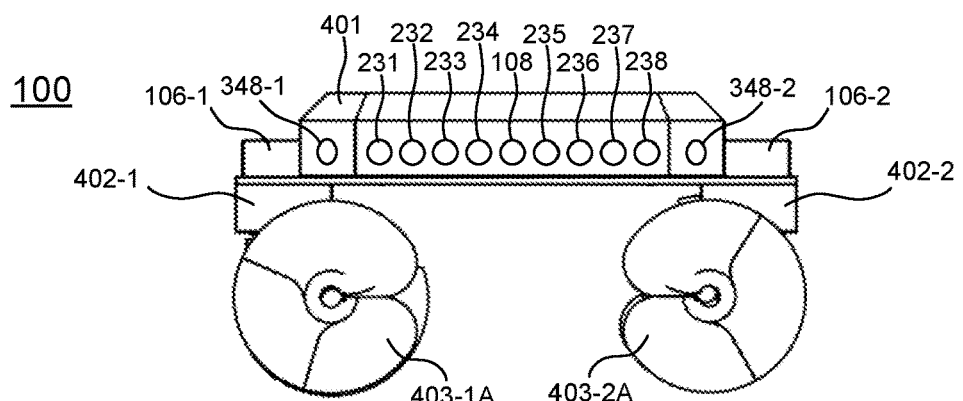

With reference to FIG. 4A-1, device 100 includes a body 401, motors 106 (106-1 and 106-2), transmissions 402 (402-1 and 402-2), and augers 403-1 and 403-2. In the illustrated embodiment of device 100, a pair of bilateral augers 403 is utilized. In some embodiments, a drive motor 106 may be coupled to an auger 403 (such as to the end of an auger 403) in a manner that eliminates the need of a transmission 402 between the drive motor 106 and the auger 403. In the depicted embodiments, the transmission is located near the middle of each auger 403, thus bifurcating each auger into two portions. In FIG. 4A-1, the front portion 403-1A of auger 403-1 is visible, as is the front portion 403-2A of auger 403-2. In typical operation, augers 343 sink at least partially into the piled granular material and thrust against it as they rotate. The direction and speed of rotation of the augers 403 determines the movement fore, aft, left, right, turning left, and/or turning right of device 100. In this manner, in various embodiments, device 100 can move atop a pile of granular material, can move beneath a pile of granular material (i.e., submerged in it), and can move to the surface after being submerged in a pile of granular material.

In some embodiments, device 100 includes one or more payloads 140. For example, lights payloads 348 (348-1 and 348-2) are included to provide illumination. In some embodiments, device 100 may additionally or alternatively include a payload bay 440 which may be fixed to device 100 or removably couplable with device 100. The payload bay 440 may provide a housing for one or more of the payloads 140 discussed herein and/or for other payloads. As one example, payload bay 440 may include sample gatherer payload 342 (show in the closed, non-sample gathering position as 342A). In some embodiments, one or more cameras 108 are included and coupled with body 401. In some embodiments, one or more sensors 120 are included and coupled with body 401 in a manner which provides access to the external environment of device 100. For example, one or more of ultrasonic transducer 231, LIDAR 232, temperature sensor 233, moisture sensor 234, optical sensor 235, infrared sensor 236, electrostatic sensor 237, and electrochemical sensor 238 may be included in a manner which provides sensor access to the operating environment of device 100.

Referring now to FIG. 4A-2, device 100 is illustrated with sample gatherer payload 342 in an open, sample gathering position 342B, to scoop up a sample of granular material as device 100 moves forward with sample gatherer payload open and submerged into the piled granular material upon which device 100 operates.

Referring now to FIG. 4A-3, device 100 is illustrated without payload bay 440. This illustrates a configuration of device 100 in which payload bay 440 has been removed or else device 100 is not configured to support a payload bay 440.

Figures 1, 4B:
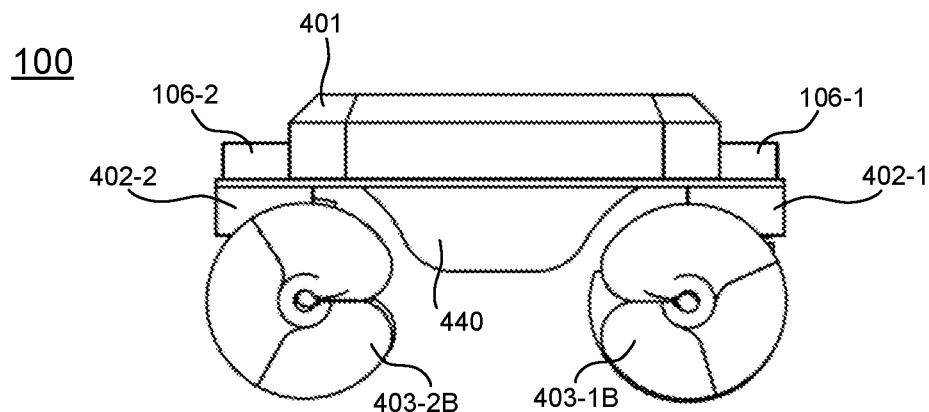
Figures 2, 4B:
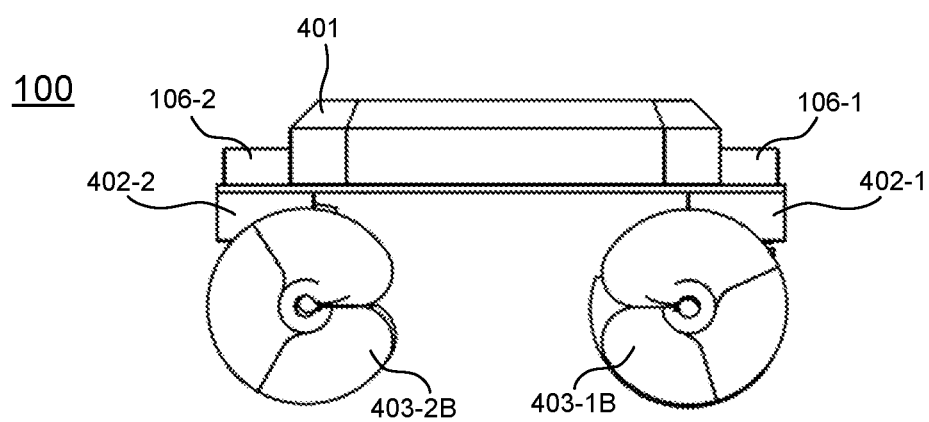

FIGS. 4B-1 and 4B-2 illustrate rear elevational views of the exterior of a device 100 which moves about and/or operates in relation to a pile of granular material, in accordance with various embodiments.

With reference to FIG. 4B-1, the rear portion 403-1B of auger 403-1 is visible, as is the rear portion 403-2B of auger 403-2.

With reference to FIG. 4B-2, device 100 is illustrated without payload bay 440. This illustrates a configuration of device 100 in which payload bay 440 has been removed or else device 100 is not configured to support a payload bay 440.

Figures 1, 4C:
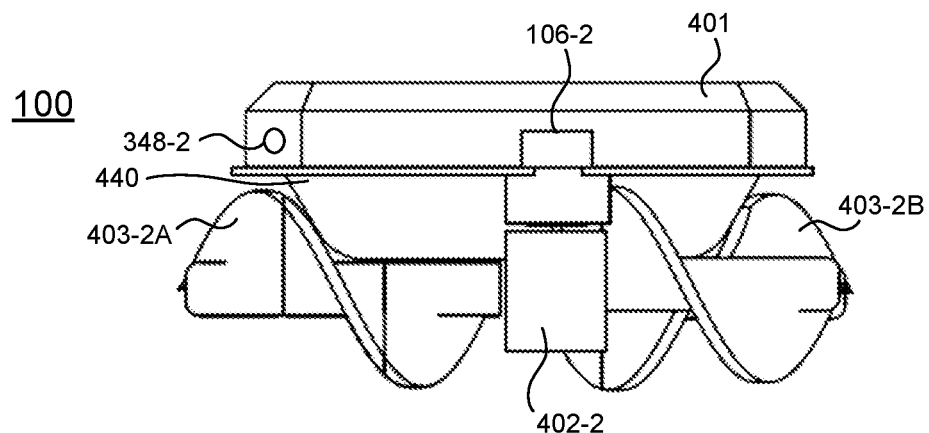
Figures 2, 4C:
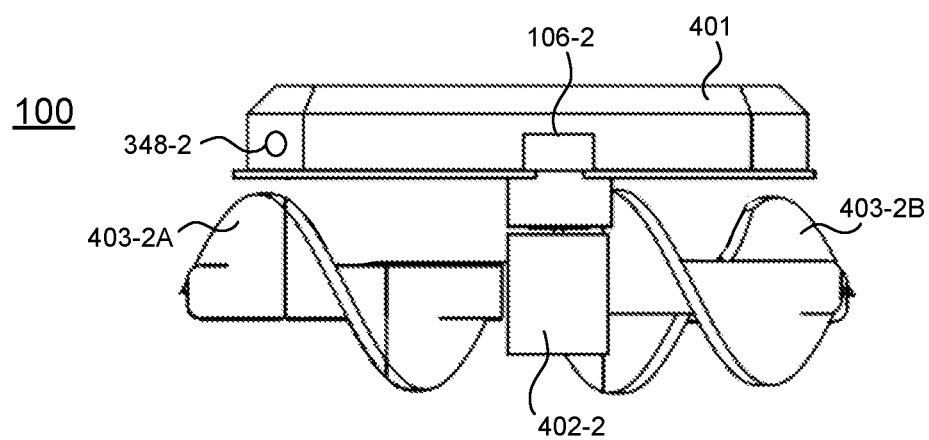

FIGS. 4C-1 and 4C-2 illustrate right elevational views of the exterior of a device 100 which moves about and/or operates in relation to a pile of granular material, in accordance with various embodiments.

With reference to FIG. 4C-1, the full span of auger 403-2 is visible, including front portion 403-2A and rear portion 403-2B, as is the drive motor 106-2 and transmission 402-2 which drive auger 403-2. This lateral side of the auger-based drive system of device 100 comprises drive motor 106-2, transmission 402-2, and auger 403-2. As has been discussed, other embodiments may directly drive the auger with the drive motor, thus eliminating the transmission from the auger-based drive system.

With reference to FIG. 4C-2, device 100 is illustrated without payload bay 440. This illustrates a configuration of device 100 in which payload bay 440 has been removed or else device 100 is not configured to support a payload bay 440.

Figures 1, 4D:
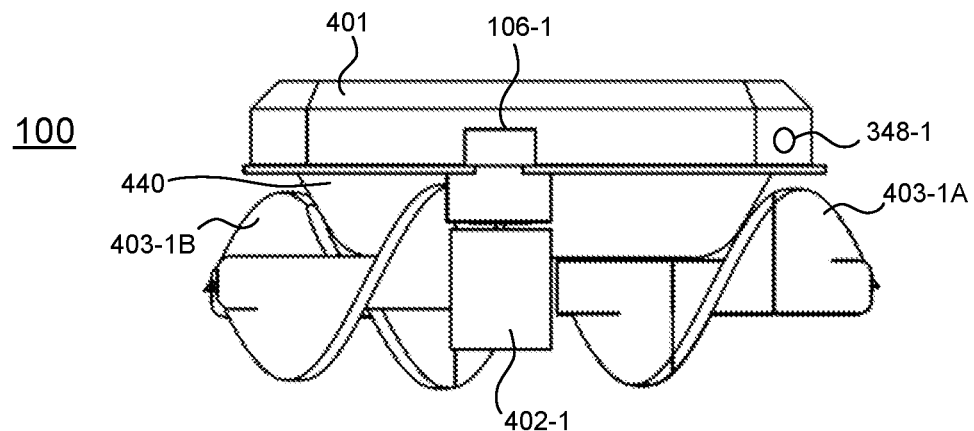
Figures 2, 4D:
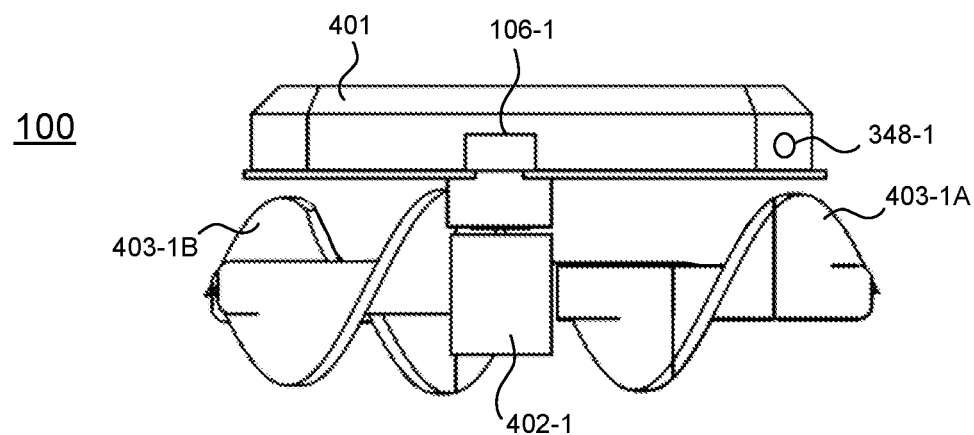

FIGS. 4D-1 and 4D-2 illustrate left elevational views of the exterior of a device 100 which moves about and/or operates in relation to a pile of granular material, in accordance with various embodiments.

With reference to FIG. 4D-1, the full span of auger 403-1 is visible, including front portion 403-1A and rear portion 403-1B, as is the drive motor 106-1 and transmission 402-1 which drive auger 403-1. This lateral side of the auger-based drive system of device 100 comprises drive motor 106-1, transmission 402-1, and auger 403-1. As has been discussed, other embodiments may directly drive the auger with the drive motor, thus eliminating the transmission from the auger-based drive system.

With reference to FIG. 4D-2, device 100 is illustrated without payload bay 440. This illustrates a configuration of device 100 in which payload bay 440 has been removed or else device 100 is not configured to support a payload bay 440.

Figures 1, 4E:
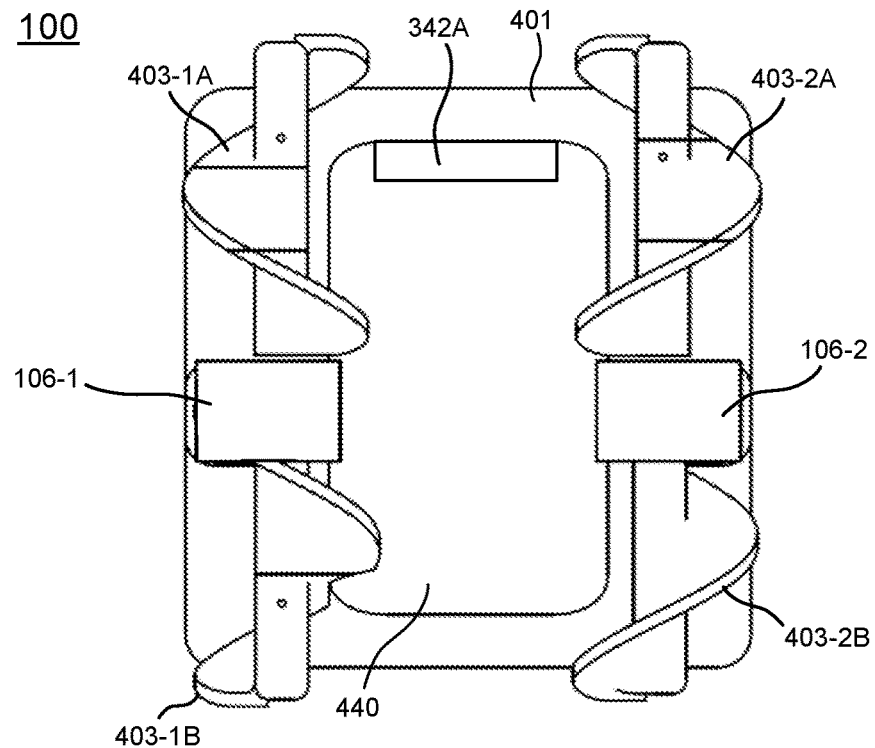
Figures 2, 4E:
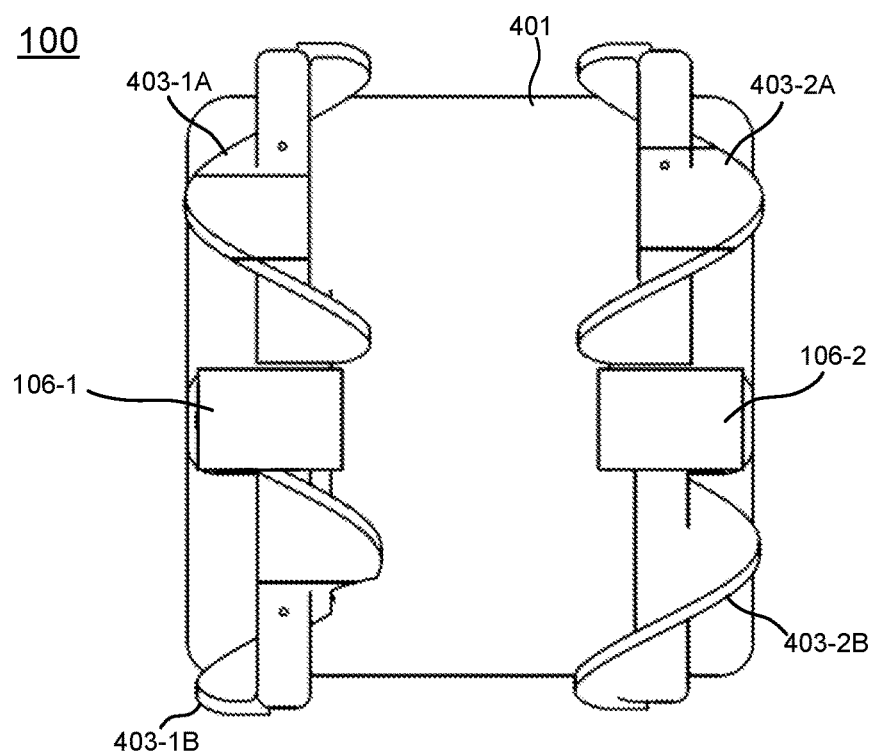

FIGS. 4E-1 and 4E-2 illustrate bottom plan views of the exterior of a device 100 which moves about and/or operates in relation to a pile of granular material, in accordance with various embodiments.

With reference to FIG. 4E-1 a bottom plan view of device 100 is shown with a payload bay 440 coupled with device 100. As can be seen in FIG. 4E-1, drive auger 403-1 and drive auger 403-2 are arranged in a bi-lateral fashion, and have fighting wound in opposite directions from each other. Thus, the bi-lateral driver augers 403-1 and 403-2 may be referred to as "opposing screw" drive augers. Propulsion is through direct interaction with the granular material in which device 100 operates and can be forward, reverse, sideways, and turning.

With reference to FIG. 4E-2, device 100 is illustrated in bottom plan view without payload bay 440. This illustrates a configuration of device 100 in which payload bay 440 has been removed or else device 100 is not configured to support a payload bay 440.

Figure 4F:
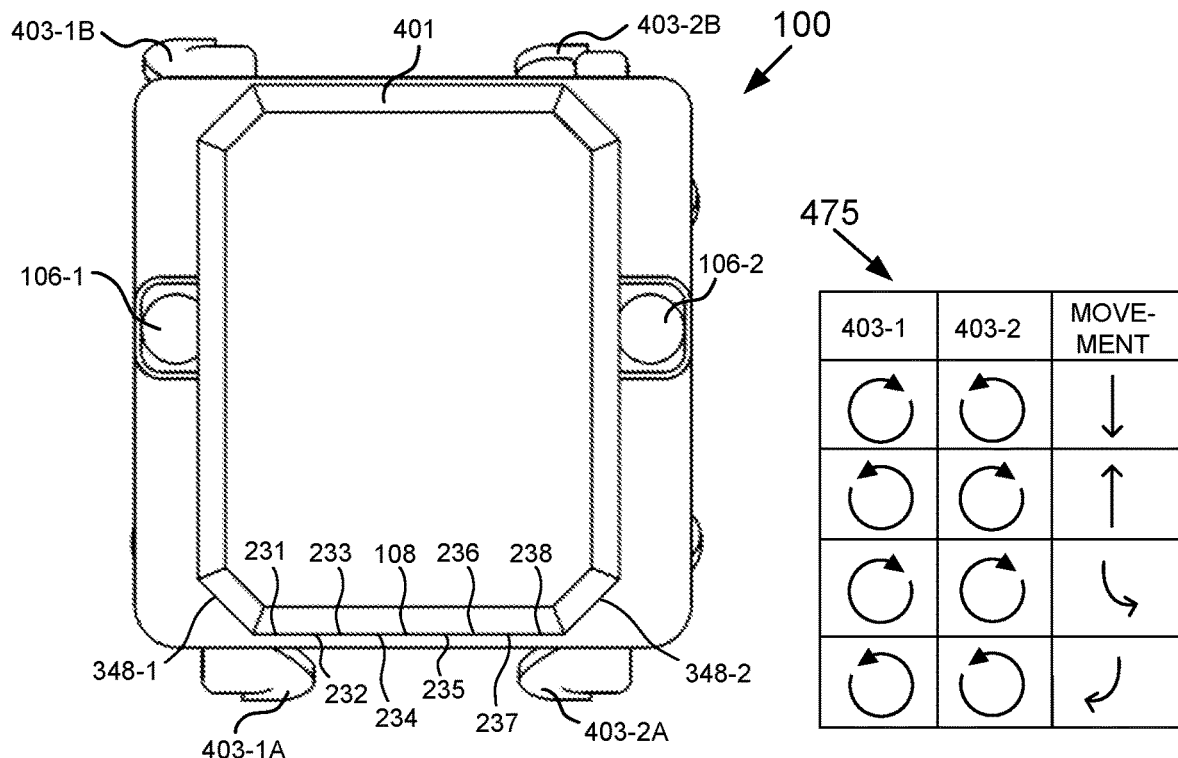
FIG. 4F illustrates a top plan view of the exterior of a device which moves about and/or operates in relation to a pile of granular material along with a chart illustrating directional movements, in accordance with various embodiments.

FIG. 4F illustrates a top plan view of the exterior of a device 100 which moves about and/or operates in relation to a pile of granular material along with a chart 475 illustrating directional movements, in accordance with various embodiments. Chart 475 shows some examples of rotations of augers 403-1 and 403-2 utilized to implement movement of device 100 in the directions indicated by the arrows in the chart. The rotations and movement directions in chart 475 are in relation to the view of device 100 shown in FIG. 4F. Although not depicted, in some embodiments, device 100 may be operated to move laterally to one side or the other.

Figure 4G:
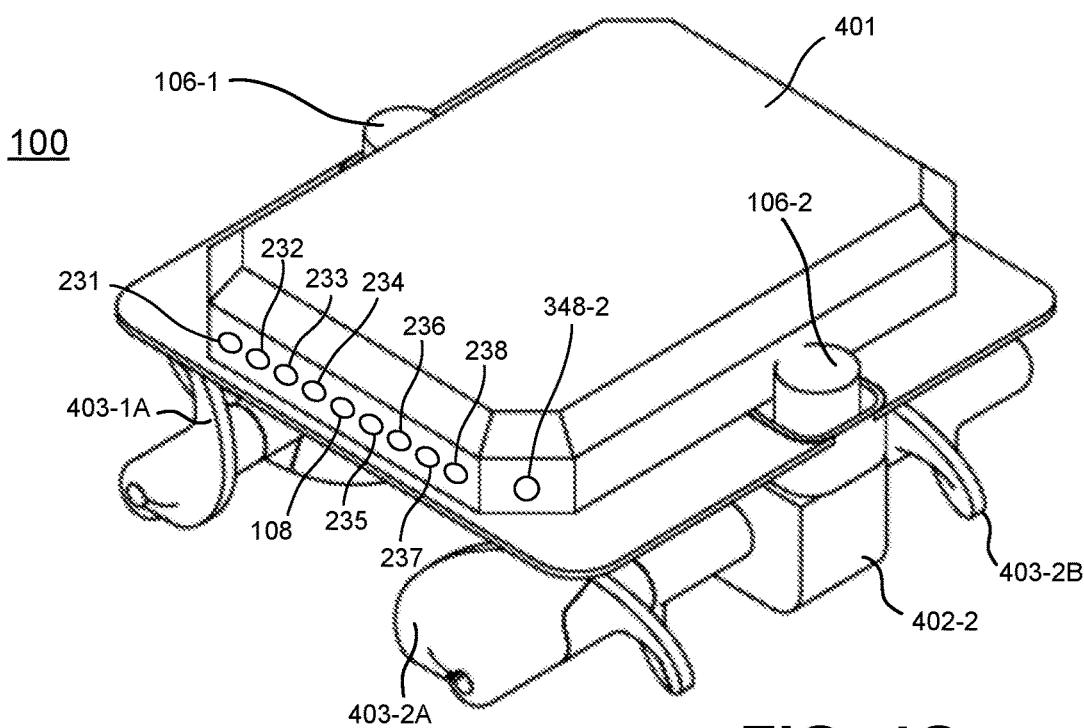
FIG. 4G illustrates an upper front right perspective view of the exterior of a device which moves about and/or operates in relation to a pile of granular material, in accordance with various embodiments.

FIG. 4G illustrates an upper front right perspective view of the exterior of a device 100 which moves about and/or operates in relation to a pile of granular material, in accordance with various embodiments.

Example Systems

Figure 5:
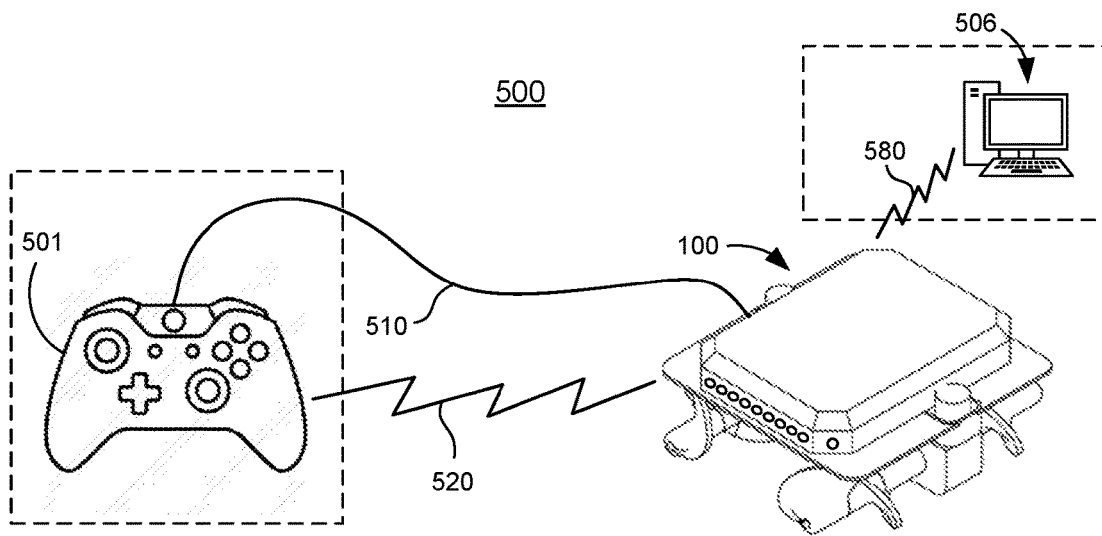
FIG. 5 illustrates some example embodiments of a bulk store slope adjustment system, in accordance with various embodiments.

FIG. 5 illustrates some example embodiments of a bulk store slope adjustment system 500, in accordance with various embodiments. System 500 includes at least device 100 when operating autonomously. In some embodiments, system 500 may include device 100 and a remotely located remote controller 501 which is communicatively coupled by wireline 510 or wirelessly 520 with device 100 (e.g., to interface 104) to send instructions or data and/or to receive information or data collected by device 100 (e.g., from operation of device 100 and/or from sensor(s) 120 and/or payload(s) 140). Remote controller 501 may be like a handholdable remote controller for a video game, or a remotely controlled model car or model airplane. In some embodiments, remote controller may have a display screen for visual display of textual information or still/video images received from device 100. In some embodiments, remote controller 501 is utilized by an operator to maneuver device 100 and/or to operate sensor(s) 120 and/or payload(s) 140. In some embodiments, system 500 may include device 100 and a remotely located computer system 506 which is communicatively coupled wirelessly 580 with device 100 to send instructions or data and/or to receive/access information or data collected by device 100 (e.g., from operation of device 100 and/or from sensor(s) 120 and/or payload(s) 140). In some embodiments, system 500 may include device 100 along with a communicatively coupled remote controller 501 and a communicatively coupled remotely located computer system 506. It should be appreciated that wireless communications 520 and 580 may be peer-to-peer, over a wide area network, or by other protocols.

Figure 6:
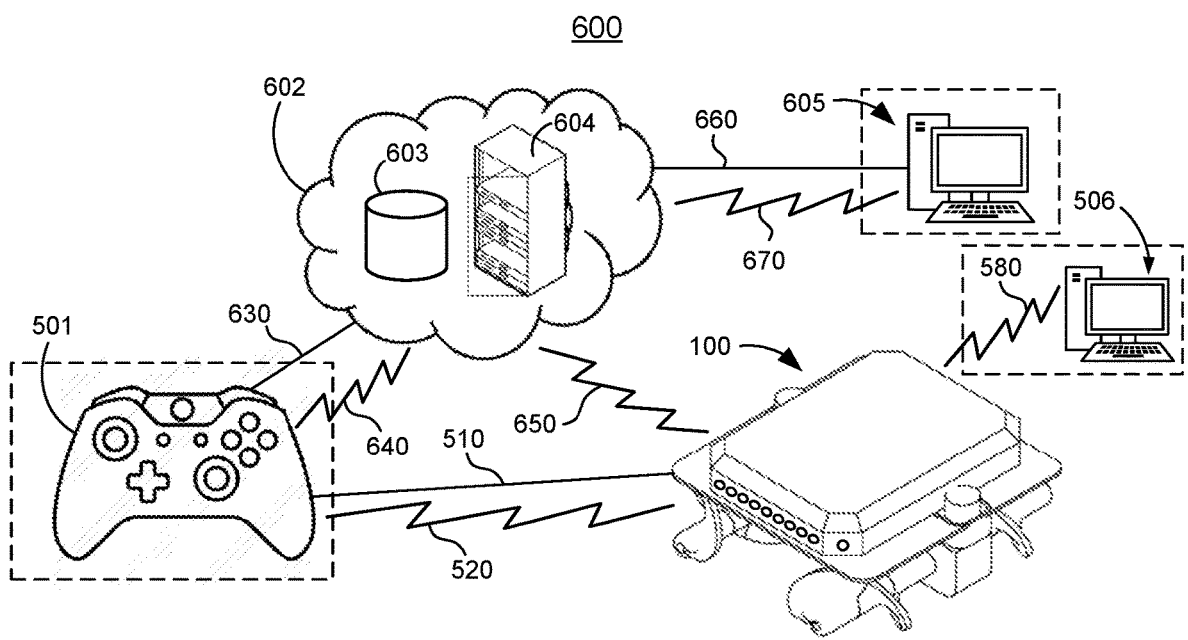
FIG. 6 illustrates some example embodiments of a bulk store slope adjustment system, in accordance with various embodiments.

FIG. 6 illustrates some example embodiments of a bulk store slope adjustment system 600, in accordance with various embodiments. In some embodiments, system 600 includes device 100 in wireless communicative coupling 650 (e.g., via the Internet) with one or more of cloud-based 602 storage 603 processing 604. In some embodiments, cloud-based 602 storage 603 is used to store data collected by device 100. In some embodiments, cloud-based processing 604 is used to process data collected by device 100 and/or to assist in autonomous decision making based on collected day. In some embodiments, system 600 additionally includes a remotely located computer 605, communicatively coupled to cloud 602 (e.g., via the internet) either wirelessly 670 or by wireline 660. In this fashion, remotely located computer 605 may access data from device 100 which has been uploaded to storage 603 and/or may communicate with or access device 100 by relay through processing/computer system 605 or cloud 602. In some embodiments, system 600 may additionally include one or more components (remote controller 501 and/or remotely located computer system 506) which were described in FIG. 5. In some embodiments, one or more of remote controller 501 and remote computer system 506 may be communicatively coupled (e.g., 630/640) with cloud 602 for transmission and/or receipt of information related to device 100.

Figure 7A:
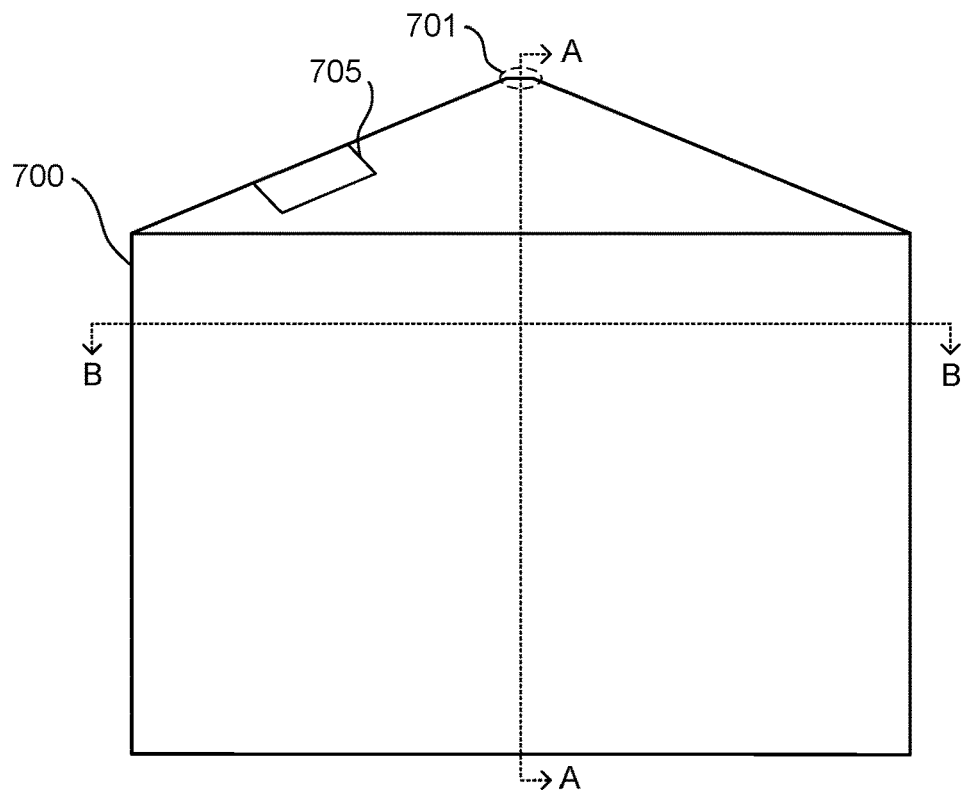
FIG. 7A illustrates an example bulk store for granular material, in accordance with various embodiments.

Example Bulk Store and Example Operations to Adjust Slope of a Portion of Piled Granular Material FIG. 7A illustrates an example bulk store 700 for granular material, in accordance with various embodiments. For purposes of example, and not of limitation, bulk store 700 is depicted as a grain bin which is used to bulk store grain (e.g., corn, wheat, soybeans, or other grain). Bulk store 700 includes an access door 705 through which device 100 may be inserted into and/or removed from bulk store 700. Bulk store also includes a top loading portal 701 through which bulk grain may be deposited, by an auger or other loading system (not depicted), and then fall into bulk store 700 to form a pile of granular material (e.g., grain 710 shown in FIG. 7B). Section lines depict location of direction of Section A-A and Section B-B which will be illustrated in other figures.

Figure 7B:
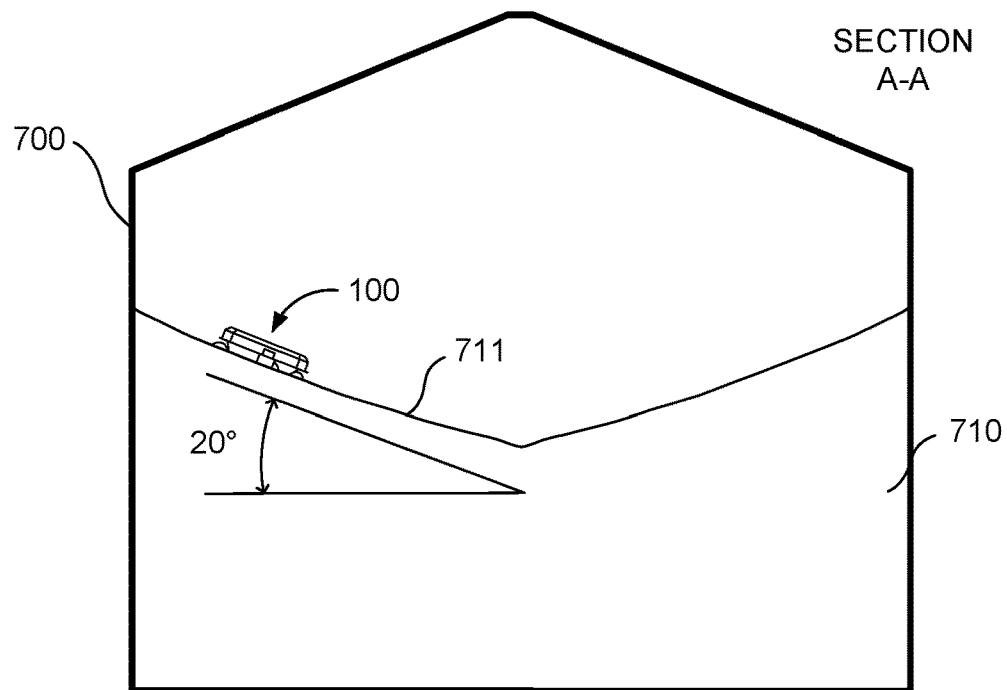
FIG. 7B illustrates a side sectional view A-A of an example bulk store for granular material which shows a device moving about and/or operating in relation to a portion of piled granular material in the bulk store, in accordance with various embodiments.
Figure 7C:
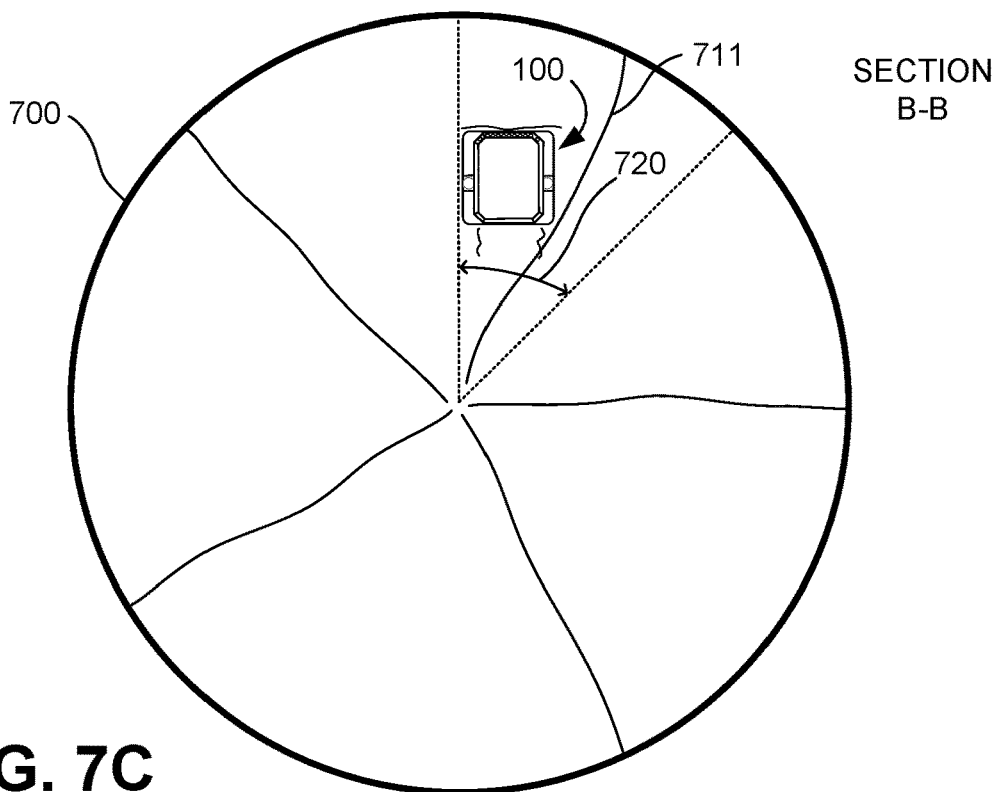
FIG. 7C illustrates a top sectional view B-B of an example bulk store for granular material which shows a device moving about and/or operating in relation to a portion of piled granular material in the bulk store, in accordance with various embodiments.

FIG. 7B illustrates a side sectional view A-A of an example bulk store 700 for granular material which shows a device 100 moving about and/or operating in relation to a portion (portion 720 as shown in FIG. 7C) of a surface 711 of piled granular material (e.g., grain 710) in the bulk store 700, in accordance with various embodiments. Because some of grain 710 has been removed from the bottom of bulk store 700, a cone shaped concavity has been created with a slope of approximately 20 degrees down from the walls to the center of bulk store 700 in the portion of piled granular material where device 100 is operating. The slope of 20 degrees is used for example purposes only. The maximum angle of the downward slope from the sides to the middle is dictated by the angle of repose, which differs for different granular materials and may differ for a particular granular material based on environmental physical characteristics (such as moisture) of the granular material. When a granular material is steeply sloped and near the angle of repose, it can be easily triggered to slide and cause entrapment of a person. When the slope of a granular material exceeds its angle of repose, it slides (like an avalanche). Additionally, when grain 710 becomes steeply sloped as illustrated during removal, it means that much of the removed grain is coming out from the center of the bin, rather than a mixture of grain from all areas of the bin. Leveling or reduction of slope, of an inwardly sloped pile, reduces risk of a slide and distributes grain from the high sloped edges to prevent/reduce spoilage of those portions of the grain.

Due to the friction of augers 403 against grain 710 and the agitation of augers 403 caused to grain 710 when device 100 traverses a portion of piled granular material (e.g., portion 720 of grain 710), viscosity of the piled granular material is disrupted. The disruption of viscosity lowers the angle of repose and, because of the slope being caused to exceed the angle of repose, incites sediment gravity flow in the portion of piled granular material down the slope. Additionally, rotational movement of the augers also displaces grain 710 and can be used to auger the grain in a desired direction or expel it such that gravity carries it down slope. Either or both of these actions can be used to disperse grain 710 and/or to adjust (reduce) the slope of portion 720.

FIG. 7C illustrates a top sectional view B-B of an example bulk store 700 for granular material which shows a device 100 moving about and/or operating in relation to a portion 720 of a surface 711 of piled granular material 710 in the bulk store 700, in accordance with various embodiments.

Figure 7D:
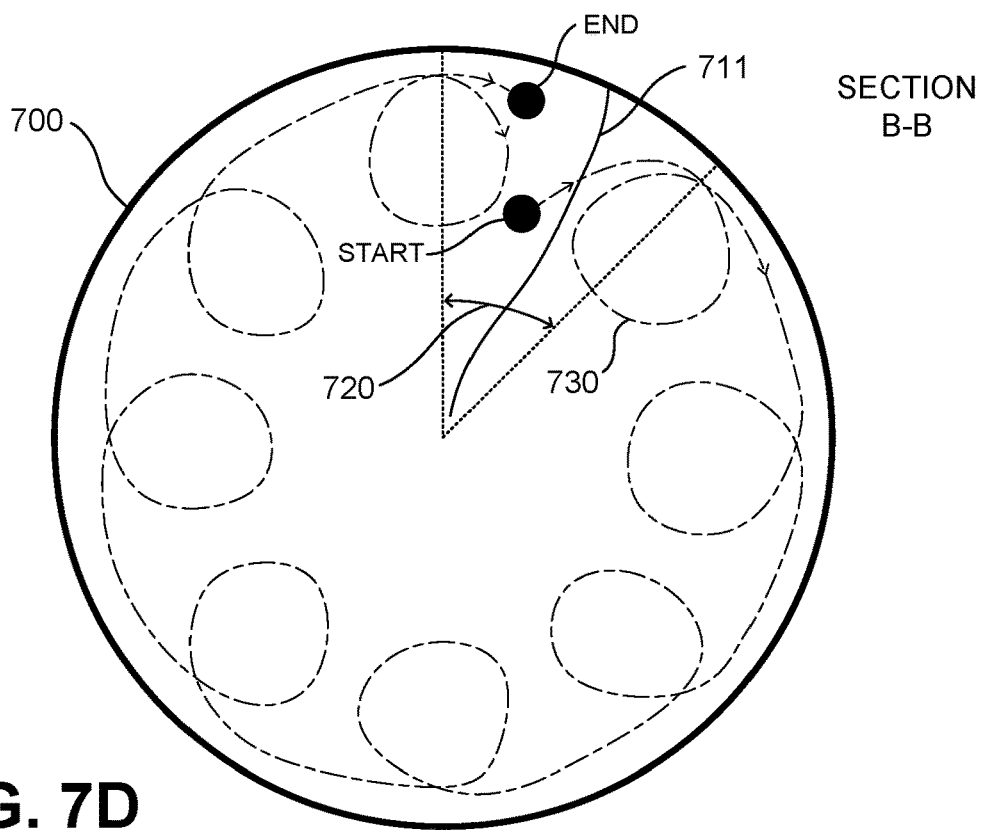
FIG. 7D illustrates a top sectional view B-B of an example bulk store for granular material which shows pattern for moving a device about and/or operating in relation to a portion of piled granular material in the bulk store, in accordance with various embodiments.

FIG. 7D illustrates a top sectional view B-B of an example bulk store 700 for granular material which shows pattern 730 for moving a device 100 about and/or operating in relation to a portion 720 of a surface 711 of piled granular material 710 in the bulk store 700, in accordance with various embodiments. In some embodiments, pattern 730 may be manually driven by a remotely located operator via remote controller 501 (for example). In some embodiments, pattern 730 may be autonomously driven by device 100. In some embodiments, pattern 730 may be initiated due to a first measurement of the angle of slope of grain 710 in portion 720 satisfying a first condition such as being beyond an acceptable threshold angle (e.g., degrees of slope). Pattern 730 or other patterns of traversal of portion 720 may be repeatedly driven until a follow-on measurement of the angle of slope of grain 710 in portion 720 meets a second condition (e.g., falls below the threshold angle or falls below some other angle such as 7 degrees). In this manner a portion (e.g., portion 720) or all of the grain in bulk store 700 can have its slope adjusted downward, closer to level.

Figure 7E:
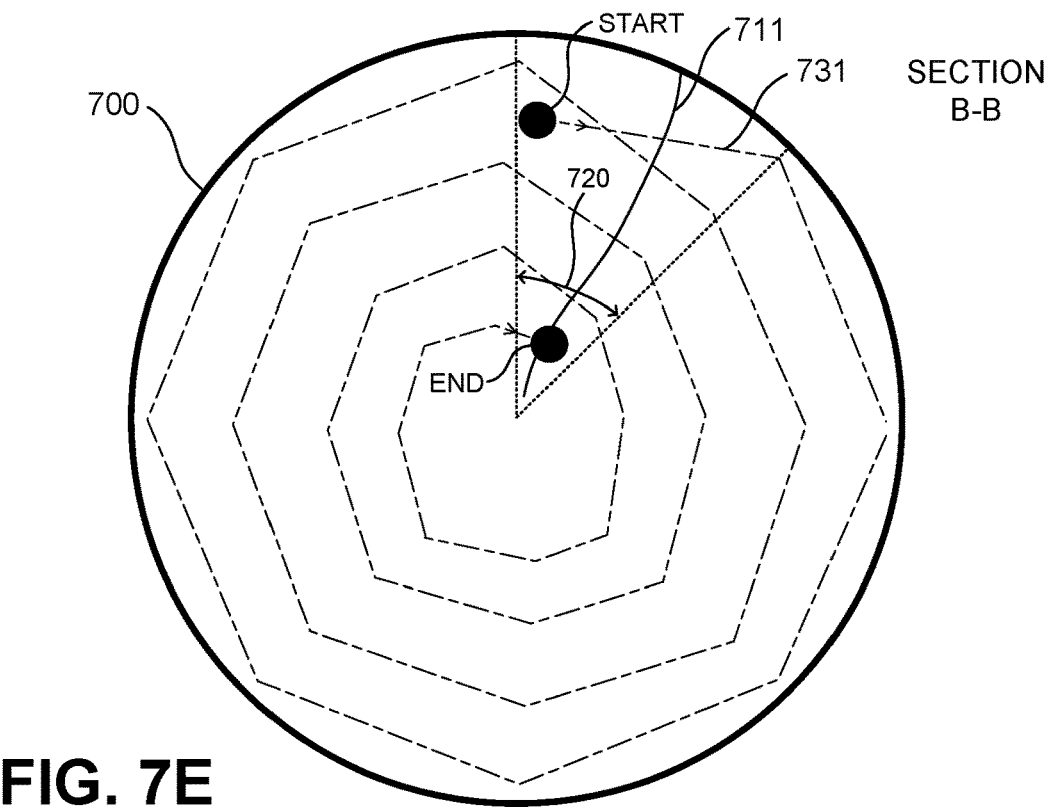
FIG. 7E illustrates a top sectional view B-B of an example bulk store for granular material which shows pattern for moving a device about and/or operating in relation to a portion of piled granular material in the bulk store, in accordance with various embodiments.

FIG. 7E illustrates a top sectional view B-B of an example bulk store 700 for granular material which shows pattern 731 for moving a device 100 about and/or operating in relation to a portion 720 of a surface 711 of piled granular material 710 in the bulk store 700, in accordance with various embodiments. In some embodiments, pattern 731 may be manually driven by a remotely located operator via remote controller 501 (for example). In some embodiments, pattern 731 may be autonomously driven by device 100. In some embodiments, pattern 731 may be initiated due to a first measurement of the angle of slope of grain 710 in portion 720 satisfying a first condition such as being beyond an acceptable threshold angle (e.g., degrees of slope). Pattern 731 or other pattern(s) of traversal of portion 720 may be repeatedly driven until a follow-on measurement of the angle of slope of grain 710 in portion 720 meets a second condition (e.g., falls below the threshold angle or falls below some other angle such as 7 degrees). In this manner a portion (e.g., portion 720) or all of the grain in bulk store 700 can have its slope adjusted downward, closer to level.

Figure 7F:
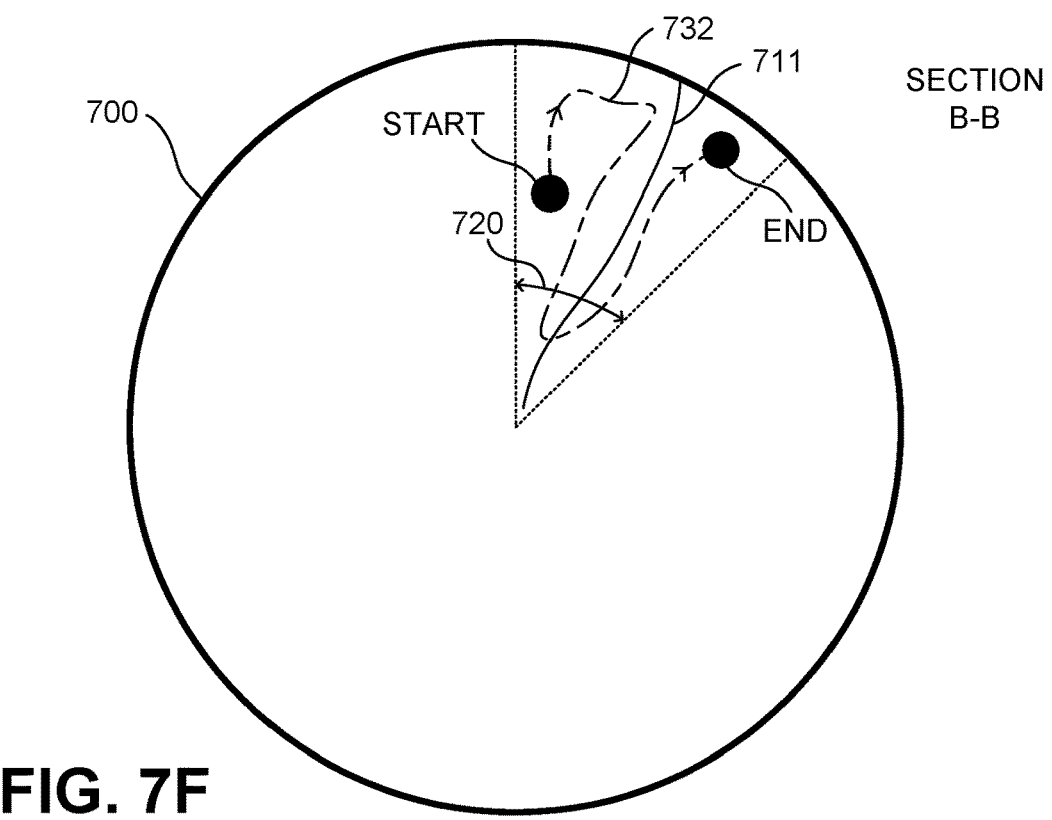
FIG. 7F illustrates a top sectional view B-B of an example bulk store for granular material which shows pattern for moving a device about and/or operating in relation to a portion of piled granular material in the bulk store, in accordance with various embodiments.

FIG. 7F illustrates a top sectional view B-B of an example bulk store 700 for granular material which shows pattern 732 for moving a device 100 about and/or operating in relation to a portion 720 of a surface 711 of piled granular material 710 in the bulk store 700, in accordance with various embodiments. In some embodiments, pattern 732 may be manually driven by a remotely located operator via remote controller 501 (for example). In some embodiments, pattern 732 may be autonomously driven by device 100. In some embodiments, pattern 732 may be initiated due to a first measurement of the angle of slope of grain 710 in portion 720 satisfying a first condition such as being beyond an acceptable threshold angle (e.g., degrees of slope). Pattern 731 or other pattern(s) of traversal of portion 720 may be repeatedly driven until a follow-on measurement of the angle of slope of grain 710 in portion 720 meets a second condition (e.g., falls below the threshold angle or falls below some other angle such as 7 degrees). In this manner a portion (e.g., portion 720) or all of the grain in bulk store 700 can have its slope adjusted downward, closer to level. In FIG. 7F, pattern 732 is confined to portion 720. In such an embodiment, only this portion may be leveled by device 100, or else device 100 may work its way around bulk store 700 portion by portion by portion, leveling each portion completely or incrementally before moving to the next portion.

FIGS. 7D-7E illustrate only three example patterns, many other patterns are possible and anticipated including, but not limited to: grid patterns, circular patterns, symmetric patterns, unsymmetrical patterns, spiral patterns, random/chaos motion (e.g., patternless), patterns/paths that are dynamically determined based on the slope and changes of the slope, and patterns which are cooperatively executed by two or more devices 100 working in communication with one another. Any of the patterns executed by device 100 may be stored in host memory 103 for automated execution by processor 102 controlling the movements of device 100 to traverse the pattern. Similarly, patternless or dynamic movement may be executed by processor 102 in an automated fashion by controlling the movements of device 100, such as to seek out portions with a slope which satisfies a first condition and traverse them until the slope satisfies the second condition.

In some embodiments, patterns or traversal operations may similarly be utilized to break up and distribute grain 710 to assist it in drying out, to prevent a crust from forming, to inspect grain, to push grain towards a sweep auger or other uptake, and/or to diminish spoilage.

In some embodiments, patterns or traversal operations may similarly be utilized to level peaks which form in grain or other piled granular material due to the method and/or location in which it is loaded into a bulk store. Such leveling better utilizes available storage space, reduces crusts or pipe formation, reduces hotspots, and/or more evenly distributes granular material of differing moisture contents.

Figure 7G:
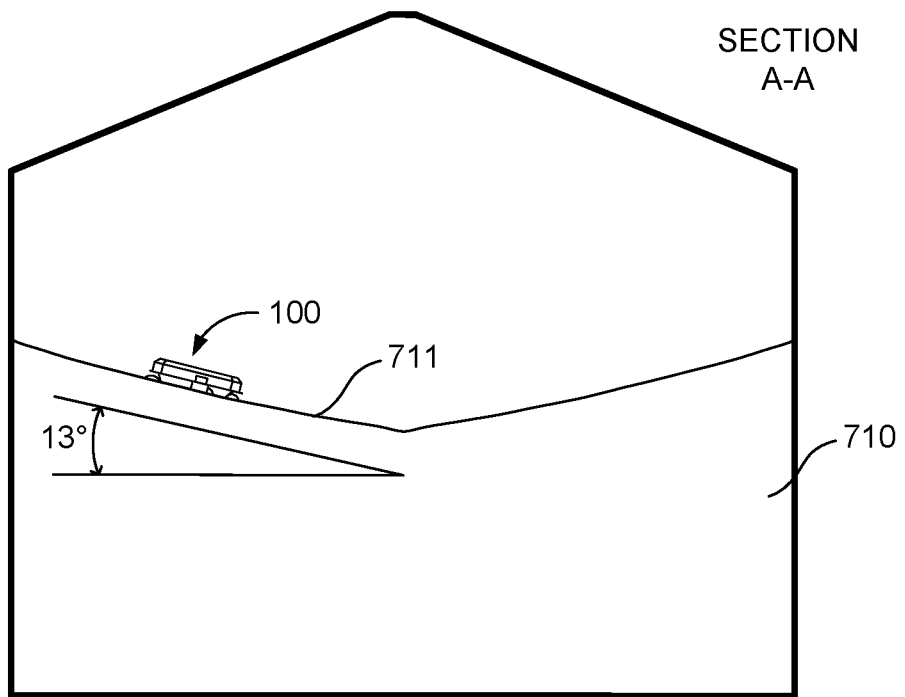
FIG. 7G illustrates a side sectional view A-A of an example bulk store for granular material which shows a device moving about and/or operating in relation to a portion of piled granular material in the bulk store, in accordance with various embodiments.

FIG. 7G illustrates a side sectional view A-A of an example bulk store 700 for granular material 710 which shows a device 100 moving about and/or operating in relation to a portion (e.g., portion 720) of a surface 711 of piled granular material 710 in the bulk store 700, in accordance with various embodiments. FIG. 7G is similar to FIG. 7B except that the slope has been downwardly adjusted from 20 degrees to approximately 13 degrees (as measured by device 100) by traversal of the portion by device 100.

Figure 7H:
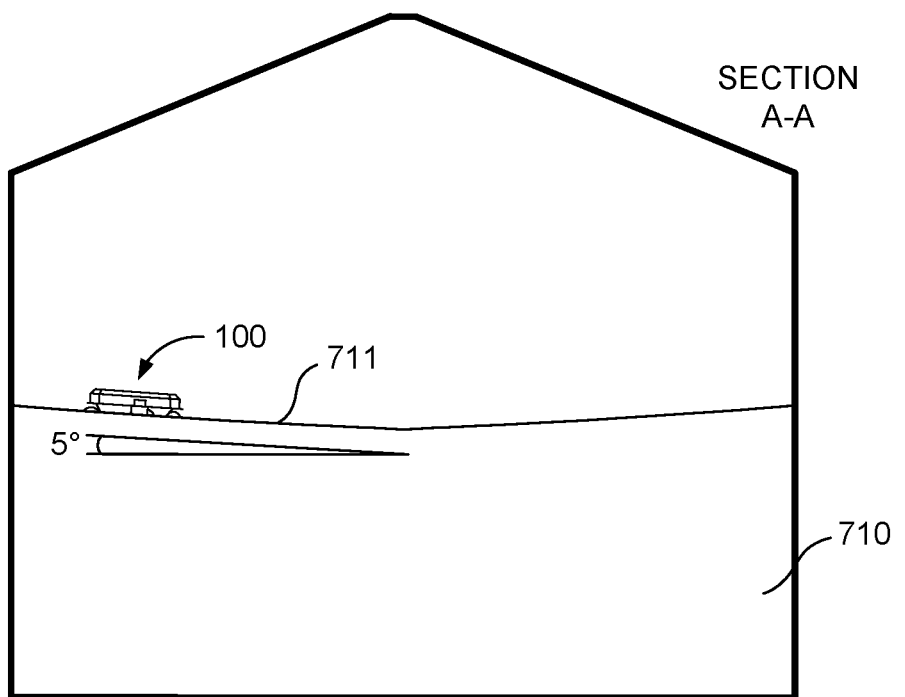
FIG. 7H illustrates a side sectional view A-A of an example bulk store for granular material which shows a device moving about and/or operating in relation to a portion of piled granular material in the bulk store, in accordance with various embodiments.

FIG. 7H illustrates a side sectional view A-A of an example bulk store 700 for granular material 710 which shows a device 100 moving about and/or operating in relation to a portion (e.g., portion 720) of a surface 711 of piled granular material 710 in the bulk store 700, in accordance with various embodiments. FIG. 7H is similar to FIG. 7G except that the slope has been further downwardly adjusted from 13 degrees to approximately 5 degrees (as measured by device 100) by traversal of the portion by device 100.

Example Methods of Bulk Store Slope Adjustment

Procedures of the methods illustrated by flow diagram 800 of FIGS. 8A-8E will be described with reference to elements and/or components of one or more of FIGS. 1-7H. It is appreciated that in some embodiments, the procedures may be performed in a different order than described in a flow diagram, that some of the described procedures may not be performed, and/or that one or more additional procedures to those described may be performed. Flow diagram 800 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 800 may be implemented in hardware, or a combination of hardware with firmware and/or software.

For purposes of example only, the device 100 of FIGS. 1-7H is a robotic device which utilizes augers (403) to move and maneuver with respect to piled granular material, such as, but not limited to grain. Robot 100 will be described as operating on or in relation to piled granular material in a bulk store, such as, but not limited to grain in a grain bin. In some embodiments, the robot 100 is free of mechanical coupling with a structure (e.g., the bulk store) in which the piled granular material is contained. For example, in some embodiments, there is no tether or safety harness coupling the robot 100 to the grain storage bin and it operates autonomously or under wireless remote control. In some embodiments, robot 100 performs the method of flow diagram 800 completely autonomously. In some embodiments, robot 100 performs the method of flow diagram 800 semi-autonomously such as by measuring a slope of grain, sending the slope to an external computer system which then determines a pattern for robot 100 to autonomously execute when traversing the piled grain. In some embodiments, robot 100 performs the method of flow diagram 800 semi-autonomously such as by receiving a remotely measured slope of grain, then autonomously determining a pattern for robot 100 to autonomously execute when traversing the piled grain.

FIGS. 8A-8E illustrate a flow diagram 800 of an example method of bulk store slope adjustment, in accordance with various embodiments.

With reference to FIG. 8A, at procedure 810 of flow diagram 800, in various embodiments, a robot 100 which includes a processor 102, a memory 103, and an auger-based drive system (e.g., augers 403), obtains a first measurement of an angle of slope of a portion of piled granular material in a bulk store, wherein the robot 100 comprises an auger-based drive system. With reference to FIGS. 7A, 7B, and 7C, this can comprise a measure of the angle of slope of portion 720 of grain 710 in bin 700. The angle can be measured and obtained autonomously by robot 100 or can be measured by a device external to robot 100 and then obtained by being communicated to or accessed by robot 100. In an embodiment, where the angle of slope is measured by robot 100, motion sensor(s) 220 may be used to measure the angle of robot 100 on a slope of portion 720 to approximate the angle of the slope. In some embodiment, procedure 810 may be skipped and an operator may simply direct robot 100 to begin traversal of a portion (e.g., portion 720) of piled granular material.

With continued reference to FIG. 8A, at procedure 820 of flow diagram 800, in various embodiments, in response to the first measurement satisfying a first condition, the robot 100 traverses the portion of piled granular material to incite sediment gravity flow in the portion of piled granular material by disruption of viscosity of the portion of piled granular material through agitation of the portion of piled granular material by auger rotation of the auger-based drive system. The traversal may be controlled by host processor 102 via control of the direction of rotation and/or the speed of rotation of augers 403 of robot 100. Robot 100 may traverse the portion (e.g., portion 720) of piled granular material (e.g., piled grain 710) in a predetermined pattern, which may be a predetermined pattern of movement stored in host memory 103 of robot 100. Robot 100 may traverse the portion (e.g., portion 720) of piled granular material (e.g., piled grain 710) in a patternless or random/chaos manner or by following dictates other than a pattern such as by dynamically seeking out areas of slope above a certain measure. In some embodiments, a pattern may be changed or altered based on information sensed by robot 100.

With continued reference to FIG. 8A, at procedure 830 of flow diagram 800, in various embodiments, robot 100 obtains a second measurement of the angle of slope of the portion of piled granular material. This second measurement is obtained after the robot has traversed the portion (e.g., portion 720) following a pattern, for a predetermined period of time, or based on other criteria for re-measurement of the slope. The second angle measurement can be measured and obtained autonomously by robot 100 or can be measured by a device external to robot 100 and then obtained by being communicated to or accessed by robot 100.

With continued reference to FIG. 8A, at procedure 840 of flow diagram 800, in various embodiments, in response to the second measurement satisfying a second condition, robot 100 ceases traversal of the portion of piled granular material. In some embodiments, the first condition is related to a first angle and the second condition is related to a second angle.

In some embodiments, where the first angle is the same as the second angle, the first condition may be met when the first measurement exceeds the angle, and the second measurement may be met when the second measurement falls below the angle. For example, the angle may be 10 degrees, and when the first measurement is 20 degrees, traversal will continue until the angle is adjusted to below 10 degrees.

In some embodiments, where the first angle and the second angle are different, the first angle is larger than the second angle. For example, the first angle may be 10 degrees while the second angle is 5 degrees. In such an embodiment, when the first measurement is 20 degrees, traversal will continue until the angle meets the second condition (e.g., drops below 5 degrees).

Figure 8B:
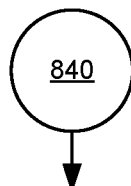

With reference to FIG. 8B, at procedure 850 of flow diagram 800, in various embodiments, in response to the second measurement failing to satisfy the second condition, the robot 100 continues traversal of the portion of piled granular material. For example, if the second condition specifies that the measurement of slope needs to be reduced to below 5 degrees, the robot would continue traversal of the portion of piled granular material in response to the second measurement being 13 degrees.

Figure 8C:
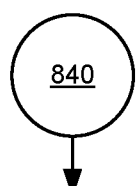

With reference to FIG. 8C, at procedure 860 of flow diagram 800, in various embodiments, during traversal of the portion (e.g., 720) of piled granular material by robot 100, a sensor 120 of robot 100 acts under instruction of host processor 102 to capture a measurement of a characteristic of the portion of piled granular. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled granular material which is traversed by robot 100.

In some embodiments, the captured measurement(s) of characteristic(s) may be transmitted to a base station (506, 605) communicatively coupled with robot 100. The base station (506, 605) is located remotely from the robot and may be configured to communicate the with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled granular material. Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

Figure 8D:
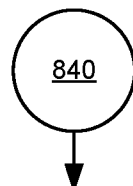

With reference to FIG. 8D, at procedure 870 of flow diagram 800, in various embodiments, a temperature sensor 233, infrared sensor 236, or infrared camera 108 of robot 100 is used to capture a temperature measurement of the portion of piled granular material during the traversal of the portion of piled granular material. In some embodiments, the captured measurement of a characteristic is paired with a location of robot 100 at the time of capture of the temperature measurement. Such paired data can be used to create a heat map of the piled granular material which is traversed by robot 100.

Figure 8E:
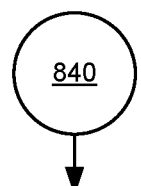

With reference to FIG. 8E, at procedure 880 of flow diagram 800, in various embodiments, robot 100 collects a sample from the portion of piled granular material during the traversal of the portion of piled granular material. For example, with reference to FIG. 4A-2, processor 102 or a remotely located operator may direct a sample collection device, such as gatherer payload 342, to open to collect a sample of grain at a particular location and to close after a sample is collected or a predetermined time period has elapsed.

Delivery of Payloads in a Bulk Store

A device 100, such as a robot, may precisely deliver and retrieve payloads within a bulk store (e.g., bulk store 700) for granular material. The payload may be any desired payload which can be carried by the device 100, numerous of which have been discussed previously, and may include a sensor (e.g., a temperature sensor, a humidity sensor, an elevation sensor, or some combination of sensors) or a probe which includes one or more of these sensors and is configured to record and/or wirelessly communicate information measured by the sensors. In various embodiments, a probe may collect information about the granular material (grain) which proximally surrounds it (e.g., the temperature local to the probe). In various embodiments, for example, device 100 can operate via remote controlled instruction, autonomously, or some combination thereof. As discussed above, device 100 is robotic and may be referred to as a "robot" or as a "robotic device," and includes an auger-based drive system which facilitates the movement and/or operation of the device in relation to a portion of piled granular material in a bulk store 700, such as a grain bin. The robotic device can be equipped with a payload delivery system allowing the precise placing of a payload such as a probe, including location coordinates within the bulk store. In some embodiments, this location is marked and stored in the payload during delivery and or in the robotic device 100 upon delivery of the payload. For example, the robot maneuvers on the granular material with its auger driven propulsion and using an adaptable tool or a probe delivery module which may be carried in payload bay 340 (e.g., probe delivery payload 344) or elsewhere on device 100, delivers the probe, and marks the probe's location upon delivery/deposition onto the granular material. An adaptable tool can deliver a variety of probes, while a probe delivery module may be configured for delivering and/or retrieving a specific type of probe.

One embodiment of a probe delivery payload 344 is illustrated in FIGS. 9A-9E, it is appreciated that any suitable probe delivery payload may be similarly utilized and that the embodiment of FIGS. 9A-9E is provided by way of example and not of limitation.

Figure 9A:
FIG. 9A-9E illustrate various views of an example probe delivery payload which may be coupled to and controlled by a device which moves about and/or operates in relation to a pile of granular material, in accordance with various embodiments.

FIG. 9A illustrates a top view of an example probe delivery payload 344 which may be coupled to and controlled by a device 100 which moves about and/or operates in relation to a pile of granular material, in accordance with various embodiments.

Figure 9B:
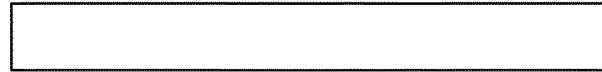

FIG. 9B illustrates a front view of an example probe delivery payload 344 which may be coupled to and controlled by a device 100, in accordance with various embodiments. The rear view is substantially the same.

Figure 9C:
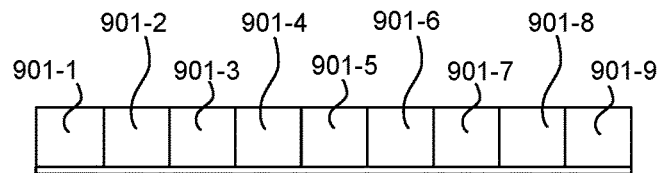

FIG. 9C illustrates a bottom view of an example probe delivery payload 344 which may be coupled to and controlled by a device 100, in accordance with various embodiments. A plurality of doors 901 (901-1, 901-2, 901-3, 901-4, 901-5, 901-6, 901-7, 901-8, 910-9) are depicted, but a greater or lesser number may be used in various embodiments. Each of the doors 901 may be independently opened by a device 100, or a processor thereof, such as by actuating a solenoid which hold a particular door in a closed position.

Figure 9D:

FIG. 9D illustrates a right side view of an example probe delivery payload 344 which may be coupled to and controlled by a device 100, in accordance with various embodiments. The left side view is a mirror image thereof.

Figure 9E:
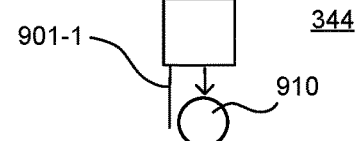

FIG. 9E illustrates a right side view of an example probe delivery payload 344 which may be coupled to and controlled by a device 100, in accordance with various embodiments. In FIG. 9E, door 901-1 has been opened by a device 100, freeing a payload 910 to be dropped via gravity. Payload 910 may be a probe which is left behind after it lands on a surface upon which the device 100 is operating.

Figure 10:
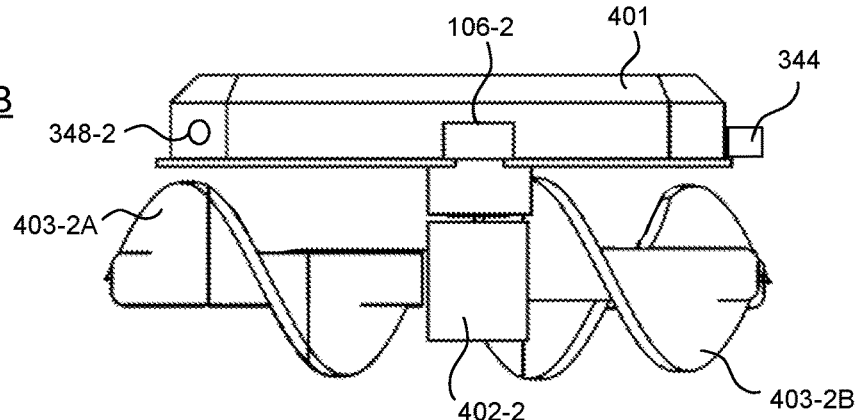
FIG. 10 illustrates a right elevational view of the exterior of a device which moves about and/or operates in relation to a pile of granular material and which includes a probe delivery payload, in accordance with various embodiments.

FIG. 10 illustrates a right elevational view of the exterior of a device 100B which moves about and/or operates in relation to a pile of granular material 710, in accordance with various embodiments. Device 100B is similar to device 100 illustrated in FIG. 4C-2, except that probe delivery payload 344 has been coupled to its rear and communicatively coupled to a host processor 102 which exerts control over which doors 901 to open and when to open them in order to precisely deliver a payload 910.

Figure 11:
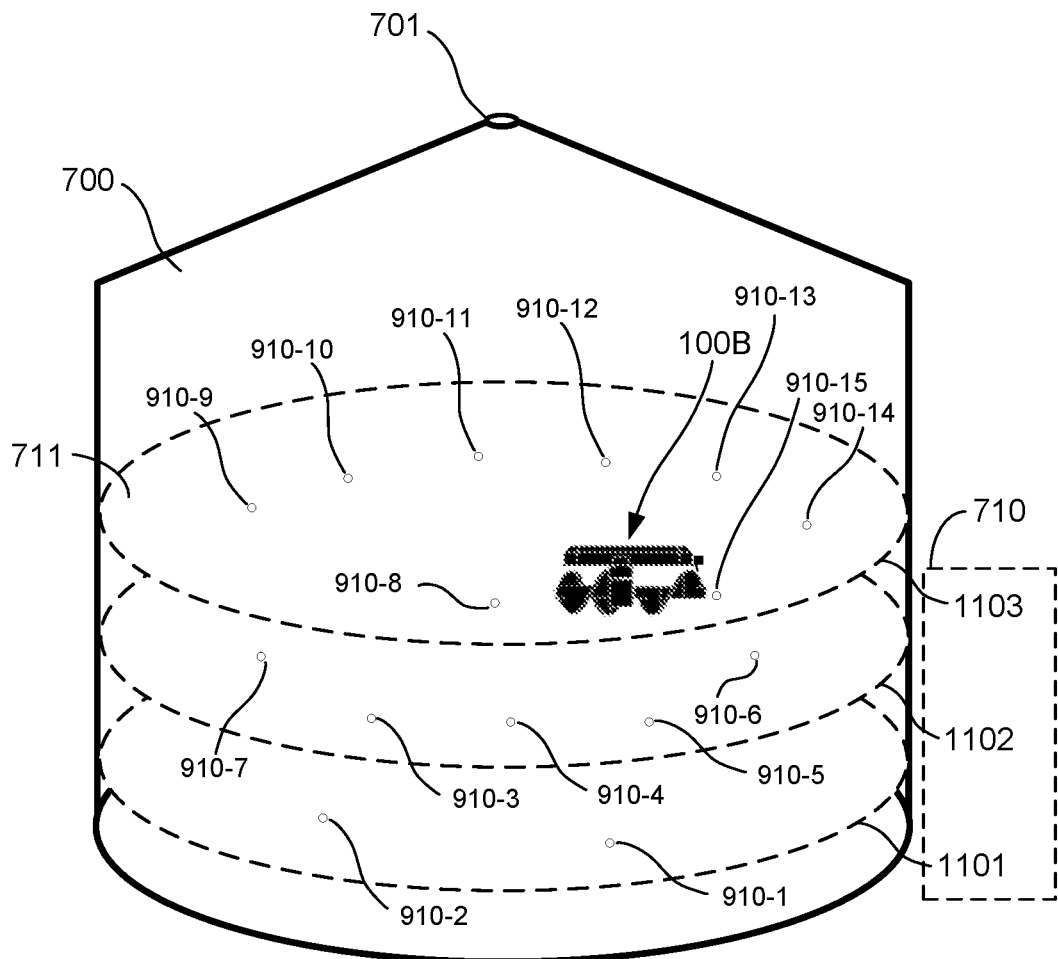
FIG. 11 illustrates robot delivery of a payload, which may be a probe or sensor, in a bulk store in a predetermined three-dimensional pattern as granular material such as grain is added to the bulk store, according to various embodiments.
Figure 12:
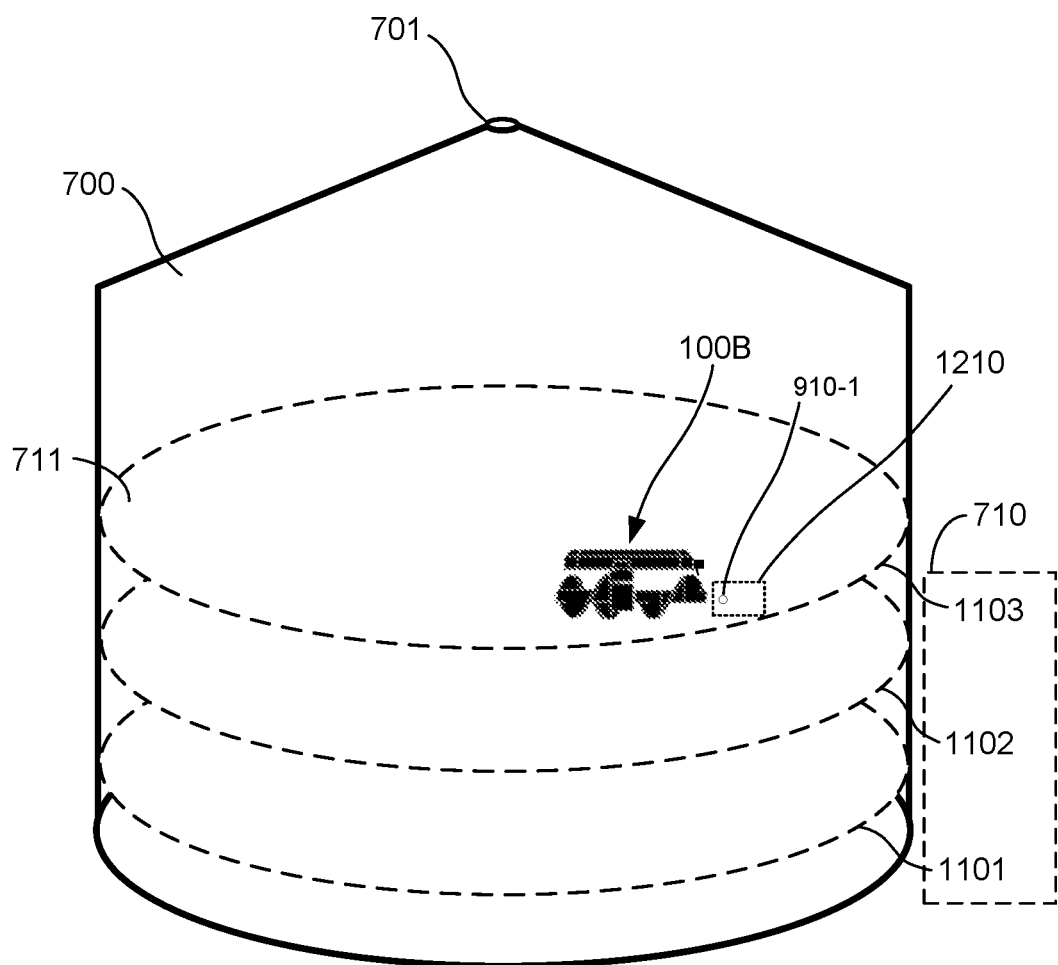
FIG. 12 illustrates robot delivery of a payload, which may be a probe or sensor, in a bulk store when triggered by detection of specified criteria, according to various embodiments.
Figure 13:
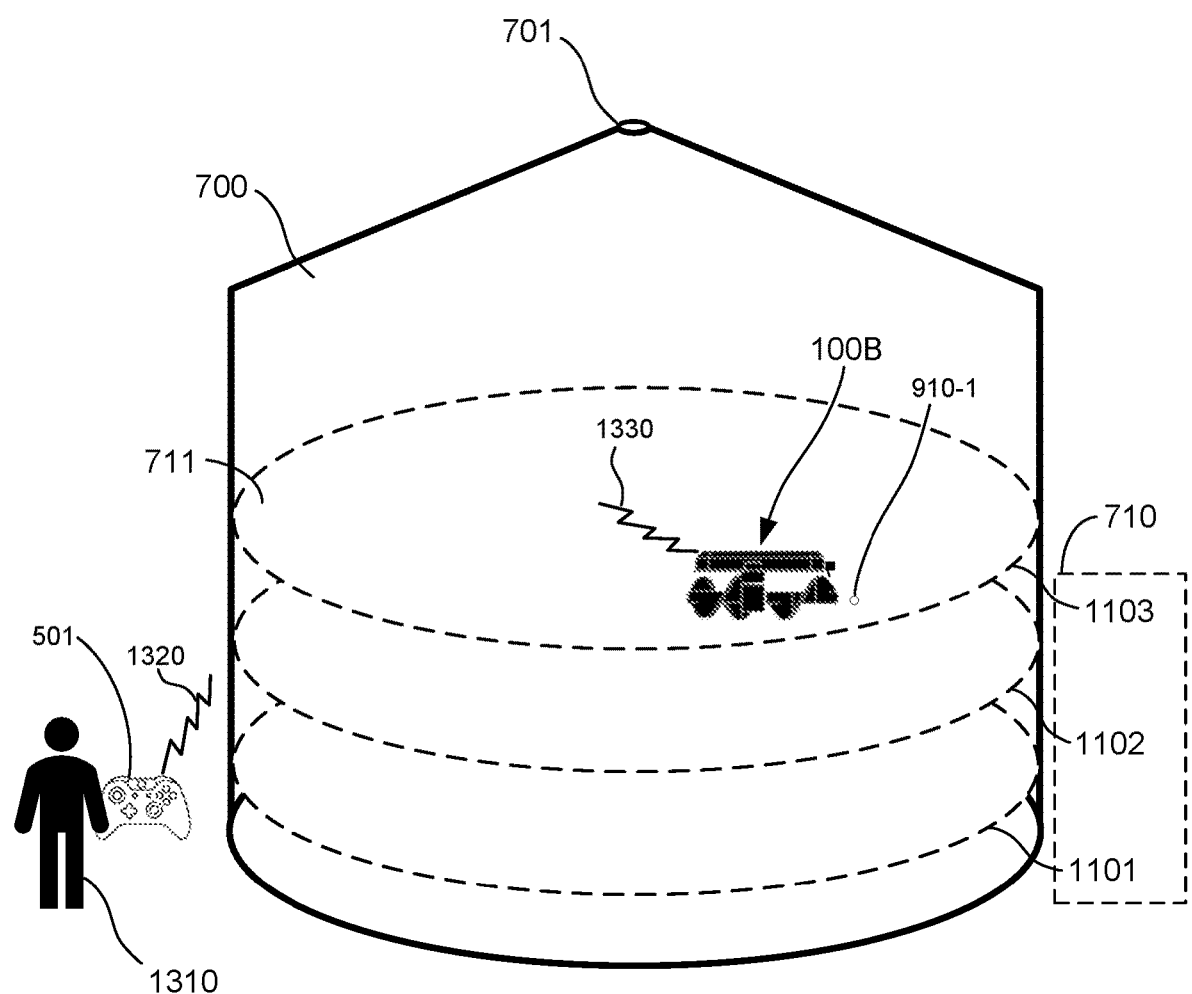
FIG. 13 illustrates robot delivery of a payload, which may be a probe or sensor, in a bulk store when triggered by human engagement, according to various embodiments.

Several methods of payload delivery are described in conjunction with description of FIGS. 11, 12, and 13. It should be appreciated that although these methods are described in isolation for purposes of clarity, they may be used in various combinations with one another. For example, while probes are being delivered according to a predetermined pattern, a device 100 (e.g., device 100B) may deliver an individual probe in a place which is not specified by the pattern in response to receiving remote controlled instructions to do so and/or in response to sensing specified criteria which satisfy a requirement for delivery of a probe.

A pattern for probe delivery may be the same pattern (or a portion thereof) used to level a piled granular material in a bin or other store. For example, during the leveling probes may be dispensed at designated locations which may be manually selected, predetermined/preprogrammed, and/or in response to meeting of sensed criterial (e.g., one or some combination of location, temperature measured, air flow measured, moisture of granular material measured, etc.). That is, while leveling piled granular material, a device 100B may encounter locations or criteria which dictate triggering of payload delivery. In this manner, payload delivery may, in some embodiments, occur coincident with other activities of device 100B.

FIG. 11 illustrates robot delivery of a payload 910, which may be a probe, in a bulk store in a predetermined three-dimensional pattern as granular material such as grain is added to the bulk store 700, according to various embodiments. Bulk store is shown as a three-dimensional side section view, similar to section A-A of FIG. 7B. Dashed discs 1101, 1102, and 1103 (shown in FIGS. 11, 12, and 13) represent portions of different levels within a pile of piled granular material 710.

In FIG. 11, device 100B is illustrated delivering a plurality of probes 910 (e.g., 910-1 through 910-15) over a period of time as grain has been loaded through top loading portal 701 of bulk store 700 to form a pile 710 of granular material (e.g., a pile of grain). For example, at level 1101, at the beginning of the loading of grain, device 100B delivered probes 910-1 and 910-2 according to a specified and predetermined, spaced out pattern. At level 1102, after more grain has been loaded atop level 1101 of piled granular material 710, device 100B delivered probes 910-3 through 910-7 according to a specified and predetermined, spaced out pattern (which may be the same or different than the pattern employed on level 1101). At level 1103, after more grain has been loaded atop level 1102 of the piled granular material 710, device 100B delivered probes 910-8 through 910-15 according to a specified and predetermined, spaced out pattern (which may be the same or different than the pattern employed on level 1101 and/or on level 1102). In the illustrated embodiment, probe 910-15 has just been delivered relative to a preprogramed position on piled granular material 710.

In some embodiments, a method of probe delivery in a predetermined pattern within a bulk store, such as a grain bin may include some of the following procedures. A probe 910, or set of probes 910, is loaded into the probe delivery payload 344 of device 100B. The device 100B is given instructions on where to deliver the probes via a pattern selection in its programmable memory 103. The device 100B is placed in the bulk store 700 facility (or on a pile of granular material 710). Granular material (e.g., grain) begins to be loaded into the bulk store 700 and/or onto the pile 710, in some embodiments. The device 100B performs a series of maneuvers on the surface of the granular material to position itself with respect to the pattern which it is executing by traversing the piled granular material 710 (which may be in the process of loading such as through a top loading portal 701). A probe 910 is placed by the device 100B (e.g., by controlling dispensation of the probe 910 from the probe delivery payload 344) in the precise location when the device 100B arrives through its maneuvering at a predetermined location in the programmed pattern. In some embodiments, the location is marked by device 100B with the probe identification (e.g., a serial number or other number assigned to the dispensed probe 910) position coordinates at the time of the delivery. Inside of a bulk store 700, the position may be realized by triangulation to beacons or other suitable means such as overhead video tracking. As part of the marking, the probe identification and/or position may be stored in a memory of device 100B and or wirelessly transmitted by device 100B. In the same manner, according to the preprogrammed pattern, one or more additional probes 910 may be placed and, in some embodiments, may have their probe identification and placed position coordinates marked (i.e., recorded by device 100B and/or wirelessly transmitted by device 100B).

FIG. 12 illustrates robot delivery of a payload 910, which may be a probe, by a device 100B in a bulk store 700 when triggered by detection of specified criteria, according to various embodiments. In FIG. 12, device 100B is illustrated delivering a probe 910-1 to a specific preprogrammed location 1210 which may be a two-dimensional location or a three-dimensional location (where the third dimension is elevation). The location may be specified as an exact set of coordinates or as a small geo-fence within which to deliver the probe 910-1. A plurality of probes may be delivered in this manner to a plurality of preprogramed locations. The specified criteria discussed above, may be arrival of device 100B at the predetermined location 1210, however additional and/or different specified criteria may determine when/where a probe 910-1 is delivered. For example, device 100B may deposit a temperature sensing probe 910 upon device 100B sensing a temperature of grain in a locality of granular material it is traversing meeting a specific criteria (e.g., exceeding a threshold temperature).

In some embodiments, a method of probe delivery within a bulk store 700, such as a grain bin, in response to detection of specified criteria may include some of the following procedures. The probe 910, or set of probes, is loaded into the probe delivery payload 344 of device 100B. Device 100B is placed in the bulk store facility 700 (or on a pile of granular material 710). Granular material (e.g., grain) begins to be loaded into the bulk store 700 and/or onto the pile 710, in some embodiments. The device 100B performs a series of maneuvers on the surface of the piled granular material 710 to position itself, where the maneuvers may be automated, based on stored instructions (e.g., a pattern), based on human remote control, or some combination thereof. The device 100B performs a series of readings with on-board sensors. The probe 910 is placed in the specific location when the sensor readings detect a predetermined condition (i.e., the specified criteria, such as grain temperature exceeding a preestablished threshold) and the device 100B triggers the delivery instructions to effect dispensation of a probe from the probe delivery payload 344. In some embodiments, the location is marked by device 100B with the probe identification (e.g., a serial number or other number assigned to the dispensed probe 910) position coordinates at the time of the delivery. Inside of a bulk store 700, the position may be realized by triangulation to beacons or other suitable means such as overhead video tracking. As part of the marking, the probe identification and/or position may be stored in a memory of device 100B and or wirelessly transmitted by device 100B. In the same manner, one or more additional probes 910 may be placed and, in some embodiments, may have their probe identification and placed position coordinates marked (i.e., recorded by device 100B and/or wirelessly transmitted by device 100B).

FIG. 13 illustrates robot delivery of a payload 910, which may be a probe, in a bulk store 700 when triggered by human engagement, according to various embodiments. For example, a human 1310 may utilize a remote controller 501 to send signals 1320 to device 100B and receive signals from device 100B. In FIG. 13, device 100B is illustrated delivering a probe 910-1 upon receiving instructions from human 1310 which are sent via remote controller 501 or by other suitable means. In some embodiments, a signal 1330 may be wirelessly sent to remote controller 501, or elsewhere, with the identification and marked location of a dispensed probe 910-1.

In some embodiments, a method of probe delivery within a bulk store 700, such as a grain bin, in response to direction by human remote control may include some of the following procedures. The probe 910, or set of probes, is loaded into the probe delivery payload 344 of device 100B. The device 100B is placed in the bulk store facility 700 (or on a pile of granular material 710). Granular material (e.g., grain) begins to be loaded into the bulk store 700 and/or onto the pile 710, in some embodiments. The device 100B performs a series of maneuvers on the surface of the granular material to position itself, where the maneuvers may be automated, based on stored instructions (e.g., a pattern), based on human remote control, or some combination thereof. The device 100B is maneuvered by human remote control to a location where it is desired to place a probe 910. The probe 910 is placed in the specific location when the human remotely triggers device 100B to provide delivery instructions to effect dispensation of a probe 910 from the probe delivery payload 344. In some embodiments, the location is marked by device 100B with the probe identification (e.g., a serial number or other number assigned to the dispensed probe 910) position coordinates at the time of the delivery. Inside of a bulk store 700, the position may be realized by triangulation to beacons or other suitable means such as overhead video tracking. As part of the marking, the probe identification and/or position may be stored in a memory of device 100B and or wirelessly transmitted by device 100B. In the same manner, human remote instruction may be used to control device 100B to maneuver and place one or more additional probes and may have their probe identification and placed position coordinates marked (i.e., recorded by device 100B and/or wirelessly transmitted by device 100B).

Piled Grain Surface Management

Procedures of the methods illustrated by flow diagram 1400 of FIGS. 14A-14D will be described with reference to elements and/or components of one or more of FIGS. 1-13. It is appreciated that in some embodiments, the procedures may be performed in a different order than described in a flow diagram, that some of the described procedures may not be performed, and/or that one or more additional procedures to those described may be performed. Flow diagram 1400 includes some procedures that, in various embodiments, are carried out by one or more processors (e.g., host processor 102 or any processor of device 100 or a computer or system to which device 100 is communicatively coupled) under the control of computer-readable and computer-executable instructions that are stored on non-transitory computer-readable storage media (e.g., host memory 103, other internal memory of device 100, or memory of a computer or system to which device 100 is communicatively coupled). It is further appreciated that one or more procedures described in flow diagram 1400 may be implemented in hardware, or a combination of hardware with firmware and/or software.

For purposes of example only, the devices 100 and 100B (generically referred to as "device 100" and/or "robot 100") is a robotic device which utilizes augers (403) to move and maneuver with respect to piled granular material, such as, but not limited to piled grain. Robot 100, which operates as a piled grain surface management robot, will be described as operating on or in relation to piled grain in a bulk store, such as, but not limited to grain in a grain bin. In some embodiments, the robot 100 is free of mechanical coupling with a structure (e.g., the bulk store) in which the piled grain is contained. For example, in some embodiments, there is no tether or safety harness coupling the robot 100 to the grain storage bin and it operates autonomously or under wireless remote control. In some embodiments, robot 100 performs the method of flow diagram 1400 completely autonomously. In some embodiments, robot 100 performs the method of flow diagram 1400 semi-autonomously such as by measuring a slope of grain, sending the slope to an external computer system which then determines a pattern for robot 100 to autonomously execute when traversing the piled grain. In some embodiments, robot 100 performs the method of flow diagram 1400 semi-autonomously such as by receiving a remotely measured slope of grain, then autonomously determining a pattern for robot 100 to autonomously execute when traversing the piled grain.

FIGS. 14A-14D illustrate a flow diagram 1400 of an example method of surface management of piled grain, in accordance with various embodiments.

With reference to FIG. 14A, at procedure 1410 of flow diagram 1400, in various embodiments, a robot 100 which includes a processor 102, a memory 103, and an auger-based drive system (e.g., augers 403) receives, instructions to traverse a surface of piled grain in a bulk store. In some embodiments, the instructions may be received wirelessly from a remotely located computer system (506, 605, 604, etc.) or wirelessly from a remote controller 501 operated by a human (i.e., a human may drive the robot 100 remotely). In some embodiments, the instructions may be preprogrammed into robot 100. In some embodiments, the instructions are for the robot 100 to follow a predetermined pattern of movement to traverse the surface of the piled grain.

With continued reference to FIG. 14A, at procedure 1420 of flow diagram 1400, in various embodiments, a processor (e.g., processor 102) of robot 100 controls movement of robot 100 according to the instructions. Via commands to motor controllers 105 and/or drive motors 106 of an auger-based drive system, the robot 100 is controlled to traverse a surface of piled grain 710 in a bulk store 700. As a result of the traversal, a crust layer of the surface is broken up by auger rotation of the auger-based drive system during the traversal. That is, the augers churn the surface of the piled grain 710 to a depth of one to several inches, thus breaking up surface crust and crust which may form a grain bridge over a void in the piled grain 710. Breaking the crust in this manner allows grain below the crust to dry more evenly and prevents spoilage that can result from the crust on the surface. Additionally, breaking up crusts which are part of a grain bridge assists in the flow of the grain when the grain is removed from the bulk store and improves human safety, should a human need to enter and walk upon the surface of the piled grain 710. The traversal may be according to a pattern, many of which have been depicted and described herein.

With continued reference to FIG. 14A, at procedure 1430 of flow diagram 1400, in various embodiments, robot 100 the processor directs, according to the instructions, traversal by the robot of a sloped portion of the piled grain to incite sediment gravity flow in the sloped portion of piled grain by disruption of viscosity of the sloped portion of piled grain through agitation of the sloped portion of the piled grain by the auger rotation of the auger-based drive system, wherein the sediment gravity flow reduces a slope of the sloped portion. As described herein, the sediment gravity flow is, effectively, a purposely induced landslide. The sloped portion may be sought out by the robot 100, in some embodiments. In some embodiments, the traversal of one or more sloped portions is repeated to bring reduce the slope of the sloped portion more toward level, which may be realized by bringing the slope below a threshold slope such between +/−5 degrees, between +/−4 degrees, +/−2 degrees, or +/−1 degree. In some embodiments, the traversal of one or more sloped portions is repeated to bring reduce the slope of the sloped portion more toward level by reducing the slope by a predetermined amount such as 3 degrees, 5 degrees, 10 degrees, etc.

With reference to FIG. 14B, at procedure 1440 of flow diagram 1400, in various embodiments, during traversal of a portion (e.g., portion 720) of piled grain by robot 100, a sensor 120 of robot 100 acts under instruction of host processor 102 to capture a measurement of a characteristic of the portion of piled granular. Some example characteristics include, but are not limited to, capturing a measurement of: temperature, humidity, moisture, gas composition, electrostatic nature, and/or electrochemical nature. A measured characteristic may also comprise an optical and/or infrared image. The captured measurement of a characteristic can be stored within memory 103 or transmitted from robot 100. In some embodiments, the captured measurement of a characteristic is paired with a location of robot 100 at the time of capture of the measurement. Such paired data can be used to create a characteristic map of the piled grain which is traversed by robot 100.

In some embodiments, the captured measurement(s) of characteristic(s) may be transmitted to a base station (506, 605) that is/are communicatively coupled with robot 100. The base station (506, 605) is located remotely from the robot and may be configured to communicate the with robot 100 over the Internet, via a wide-area network, via a peer-to-peer communication, or by other means. Via such communications, the base station (506, 605) may receive data collected by robot 100 (including motion sensor data) collected by the robot during the traversal of the portion of piled grain. Additionally, or alternatively, via such communications, the base station (506, 605) may relay instructions to robot 100.

In some embodiments, the captured measurement(s) of characteristic(s) may be transmitted to a cloud-based 602 storage 603 and/or processing 604 which is/are communicatively coupled with robot 100. The cloud-based infrastructure 602 may be utilized to process data, store data, make data available to other devices (e.g., computer 605), and/or relay information or instructions from other devices (e.g., computer 605) to robot 100.

With reference to FIG. 14C, at procedure 1450 of flow diagram 1400, in various embodiments, a temperature sensor 233, infrared sensor 236, or infrared camera 108 of robot 100 is used to capture a temperature measurement of a portion (e.g., portion 720) of piled grain during the traversal of the portion of piled grain. In some embodiments, the captured measurement of a characteristic is paired with a location of robot 100 at the time of capture of the temperature measurement. Such paired data can be used to create a heat map of the piled grain which is traversed by robot 100. Additionally, temperature data can provide an operator of the bulk store information about the conditions of storage, quality of grain, and/or identify areas for additional traversal to prevent crust formation and ensure air circulation.

With reference to FIG. 14D, at procedure 1460 of flow diagram 1400, in various embodiments, a probe delivery payload 344 delivers a probe 910 onto a surface of the piled grain 710. As described herein, the probe may have sensor which measure and report conditions of the grain. The probe may be delivered during load-in of grain, and thus become buried in grain. This may facilitate, over time, positioning of probes which provide measurements at different levels within a column of piled grain 710. Such delivery of probes may be based on preprogrammed positions in a patter, coordinate locations, human direction, or automated response of robot 100B upon detecting a particular characteristic (e.g., grain temperature above a preset threshold).

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A piled grain surface management robot, the robot comprising:
    an auger-based drive system comprising bilateral augers;
    a memory; and
    a processor coupled with the memory and configured to:
        control movement of the robot via the bilateral augers of the auger-based drive system to traverse about a surface of piled grain in a bulk store; and
        direct a traversal, by the robot, about a sloped portion of the surface of the piled grain to incite sediment gravity flow in the sloped portion by disruption of viscosity of the sloped portion through agitation of the sloped portion by auger rotation of the bilateral augers of the auger-based drive system, wherein the sediment gravity flow reduces an angle of slope of the sloped portion.

2. The robot of claim 1, wherein the processor is further configured to: continue directing the traversal, by the robot, of the sloped portion until the angle of slope of the sloped portion falls below a threshold angle.

3. The robot of claim 1, wherein the processor is further configured to:
    direct an additional traversal, by the robot, about the surface of the piled grain in the bulk store, wherein a crust layer of the surface is broken up by the auger rotation of the bilateral augers of the auger-based drive system during the additional traversal.

4. The robot of claim 1, wherein the processor is further configured to:
    capture, by a sensor of the robot, a measurement of a characteristic of the piled grain during the traversal of the sloped portion.

5. The robot of claim 1, wherein the processor is further configured to:
    capture, by a sensor of the robot, a temperature measurement of the piled grain during the traversal.

6. The robot of claim 1, wherein the processor is further configured to:
    deliver a probe onto the surface of the piled grain during the traversal.

7. The robot of claim 1, wherein the traversal comprises the processor being configured to direct the traversal of the sloped portion of the surface of the piled grain according to a predetermined pattern of movement stored in the memory.

8. The robot of claim 1, wherein the traversal comprises traversal under remote control of a human operator.

9. The robot of claim 1, wherein the traversal comprises traversal according to instructions sent from a computer located remotely from the robot, wherein the instructions are wirelessly received by the robot.

10. A method of piled grain surface management, the method comprising:
 receiving at a robot, instructions to traverse a surface of piled grain in a bulk store;
 controlling, by a processor according to the instructions, movement of the robot via bilateral augers of an auger-based drive system to traverse about the surface of the piled grain in the bulk store; and
 directing, by the processor according to the instructions, a traversal by the robot about a sloped portion of the surface of piled grain to incite sediment gravity flow in the sloped portion by disruption of viscosity of the sloped portion through agitation of the sloped portion by auger rotation of the bilateral augers of the auger-based drive system, wherein the sediment gravity flow reduces an angle of slope of the sloped portion.

11. The method of grain surface management as recited in claim 10, further comprising:
 capturing, by a sensor of the robot, a measurement of a characteristic of the piled grain during the traversal.

12. The method of grain surface management as recited in claim 10, further comprising:
 capturing, by a sensor of the robot, a temperature measurement of the piled grain during the traversal.

13. The method of grain surface management as recited in claim 10, further comprising:
 delivering a probe onto the surface of the piled grain during the traversal.

14. The method of grain surface management as recited in claim 10, wherein the receiving at a robot, instructions to traverse a surface of piled grain in a bulk store comprises:
 receiving instructions to follow a predetermined pattern of movement in the traversal.

15. The method of grain surface management as recited in claim 10, wherein the receiving at a robot, instructions to traverse a surface of piled grain in a bulk store comprises:
 receiving the instructions as remote-control instructions from a human operator.

16. The method of grain surface management as recited in claim 10, wherein the receiving at a robot, instructions to traverse a surface of piled grain in a bulk store comprises:
 receiving the instructions from a computer located remotely from the robot, wherein the instructions are wirelessly received by the robot.

17. A non-transitory computer readable storage medium comprising instructions embodied thereon which, when executed, cause a processor to perform a method of piled grain surface management, the method comprising:
 receiving at a robot, instructions to traverse a surface of piled grain in a bulk store;
 controlling, by a processor according to the instructions, movement of the robot via bilateral augers of an auger-based drive system to traverse about the surface of the piled grain in the bulk store; and
 directing, by the processor according to the instructions, a traversal by the robot about a sloped portion of the surface of piled grain to incite sediment gravity flow in the sloped portion by disruption of viscosity of the sloped portion through agitation of the sloped portion by auger rotation of the bilateral augers of the auger-based drive system, wherein the sediment gravity flow reduces an angle of slope of the sloped portion.

18. The non-transitory computer readable storage medium of claim 17, wherein the method further comprises:
 capturing, by a sensor of the robot, a measurement of a characteristic of the piled grain during the traversal.

19. The non-transitory computer readable storage medium of claim 17, wherein the method further comprises:
 capturing, by a sensor of the robot, a temperature measurement of the piled grain during the traversal.

20. The non-transitory computer readable storage medium of claim 17, wherein the method further comprises:
 delivering a probe onto the surface of the piled grain during the traversal.

21. The non-transitory computer readable storage medium of claim 17, wherein the receiving at a robot, instructions to traverse a surface of piled grain in a bulk store comprises:
 receiving instructions to follow a predetermined pattern of movement in the traversal.

22. The non-transitory computer readable storage medium of claim 17, wherein the receiving at a robot, instruction to traverse a surface of piled grain in a bulk store comprises:
 receiving the instructions as remote-control instructions from a human operator.

23. The non-transitory computer readable storage medium of claim 17, wherein the receiving at a robot, instruction to traverse a surface of piled grain in a bulk store comprises:
 receiving the instructions from a computer located remotely from the robot.

* * * * *